US009011226B2

(12) United States Patent
Montano

(10) Patent No.: US 9,011,226 B2
(45) Date of Patent: Apr. 21, 2015

(54) GAMING SYSTEM AND METHOD PROVIDING A MULTIPLAYER CARD GAME WITH MULTIPLE FOLD OPTIONS AND INTERRELATED BONUSES

(71) Applicant: IGT, Las Vegas, NV (US)

(72) Inventor: Andreas C. Montano, Kirland, WA (US)

(73) Assignee: IGT, Las Vegas, NV (US)

( * ) Notice: Subject to any disclaimer, the term of this patent is extended or adjusted under 35 U.S.C. 154(b) by 107 days.

(21) Appl. No.: 13/934,972

(22) Filed: Jul. 3, 2013

(65) Prior Publication Data

US 2015/0018062 A1 Jan. 15, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .......... *G07F 17/3293* (2013.01); *G07F 17/323* (2013.01); *G07F 17/3276* (2013.01)

(58) Field of Classification Search

USPC .................................... 463/20, 22, 25, 40, 42

See application file for complete search history.

(56) References Cited

U.S. PATENT DOCUMENTS

| | | | |
|---|---|---|---|
| 5,100,137 | A | 3/1992 | Fulton et al. |
| 5,167,413 | A | 12/1992 | Fulton et al. |
| 5,251,897 | A | 10/1993 | Fulton et al. |
| 5,322,295 | A | 6/1994 | Cabot et al. |
| 5,374,067 | A | 12/1994 | Jones et al. |
| 5,377,973 | A | 1/1995 | Jones et al. |
| 5,380,012 | A | 1/1995 | Jones et al. |
| 5,382,025 | A | 1/1995 | Sklansky et al. |

(Continued)

FOREIGN PATENT DOCUMENTS

| | | |
|---|---|---|
| AU | 2006333559 | 7/2007 |
| CA | 2280194 | 2/2001 |

(Continued)

OTHER PUBLICATIONS

Fast Online Poker Games—Zoom Ring Games and Tournaments: More poker, less time!, PokerStars.com, available at http://www.pokerstars.com/poker/zoom/, printed Jul. 2, 2013 (3 pages).

(Continued)

*Primary Examiner* — Adetokunbo O Torimiro

(74) *Attorney, Agent, or Firm* — Neal, Gerber & Eisenberg LLP

(57) ABSTRACT

Various embodiments of the present disclosure are directed to a gaming system and method providing a multiplayer card game with multiple fold options and interrelated bonuses. In one embodiment, the gaming system enables a player to input either a first fold input or a second different fold input should the player desire to fold the player's hand during a play of the card game. If the gaming system receives the first fold input from the player, the gaming system: (a) folds the player's hand, (b) automatically removes the player from the virtual table, and (c) automatically assigns the player to a second different virtual table for at least one subsequent play of the card game. If, on the other hand, the gaming system receives the second fold input from the player, the gaming system folds the player's hand and does not remove the player from the virtual table.

20 Claims, 21 Drawing Sheets

(56) References Cited

U.S. PATENT DOCUMENTS

| | | | |
|---|---|---|---|
| 5,411,257 | A | 5/1995 | Fulton et al. |
| 5,431,408 | A | 7/1995 | Adams et al. |
| 5,437,451 | A | 8/1995 | Fulton et al. |
| 5,531,448 | A | 7/1996 | Moody et al. |
| 5,636,842 | A | 6/1997 | Cabot et al. |
| 5,732,950 | A | 3/1998 | Moody et al. |
| 5,752,702 | A | 5/1998 | McDoniel et al. |
| 5,755,621 | A | 5/1998 | Marks et al. |
| 5,803,809 | A | 9/1998 | Yoseloff |
| 5,820,460 | A | 10/1998 | Fulton et al. |
| 5,823,873 | A | 10/1998 | Moody et al. |
| 5,833,536 | A | 11/1998 | Davids et al. |
| 5,882,259 | A | 3/1999 | Holmes et al. |
| 5,911,418 | A | 6/1999 | Adams et al. |
| 5,954,335 | A | 9/1999 | Moody et al. |
| 5,957,774 | A | 9/1999 | Holmes et al. |
| 6,007,066 | A | 12/1999 | Moody et al. |
| 6,050,658 | A | 4/2000 | O'Sullivan et al. |
| 6,062,979 | A | 5/2000 | Inoue |
| 6,098,985 | A | 8/2000 | Moody et al. |
| 6,135,883 | A | 10/2000 | Hachquet |
| 6,176,781 | B1 | 1/2001 | Walker et al. |
| 6,193,235 | B1 | 2/2001 | Vancura et al. |
| 6,196,547 | B1 | 3/2001 | Pascal et al. |
| 6,248,016 | B1 | 6/2001 | Walker et al. |
| 6,257,979 | B1 | 7/2001 | Walker et al. |
| 6,311,978 | B1 | 11/2001 | Moody |
| 6,332,839 | B2 | 12/2001 | Walker et al. |
| 6,334,613 | B1 | 1/2002 | Yoseloff |
| 6,375,567 | B1 | 4/2002 | Acres |
| 6,390,474 | B1 | 5/2002 | Terminel et al. |
| 6,406,023 | B1 | 6/2002 | Rowe |
| 6,416,407 | B1 | 7/2002 | Carrico et al. |
| 6,419,578 | B1 | 7/2002 | Moody et al. |
| 6,422,940 | B1 | 7/2002 | Walker et al. |
| 6,474,645 | B2 | 11/2002 | Tarantino |
| 6,481,717 | B1 | 11/2002 | Richardelle |
| 6,517,074 | B1 | 2/2003 | Moody et al. |
| 6,523,829 | B1 | 2/2003 | Walker et al. |
| 6,533,658 | B1 | 3/2003 | Walker et al. |
| 6,561,898 | B2 | 5/2003 | Moody |
| 6,568,680 | B1 | 5/2003 | Moody et al. |
| 6,569,014 | B2 | 5/2003 | Walker et al. |
| 6,575,831 | B1 | 6/2003 | Gonen et al. |
| 6,592,456 | B2 | 7/2003 | Walker et al. |
| 6,652,377 | B1 | 11/2003 | Moody |
| 6,672,959 | B2 | 1/2004 | Moody et al. |
| 6,726,427 | B2 | 4/2004 | Jarvis et al. |
| 6,729,961 | B1 | 5/2004 | Millerschone |
| 6,902,166 | B2 | 6/2005 | Stern |
| 6,916,245 | B1 | 7/2005 | Vancura et al. |
| 6,935,950 | B2 | 8/2005 | Tarantino |
| 6,955,356 | B2 | 10/2005 | Moody |
| 6,964,418 | B2 | 11/2005 | Moody |
| 6,969,316 | B2 | 11/2005 | Jarvis et al. |
| 6,991,538 | B2 | 1/2006 | Cannon |
| 6,994,624 | B2 | 2/2006 | Gold et al. |
| 7,056,207 | B2 | 6/2006 | Walker et al. |
| 7,059,965 | B2 | 6/2006 | Jackson |
| 7,137,628 | B2 | 11/2006 | Moody |
| 7,156,397 | B2 | 1/2007 | Moody et al. |
| 7,156,734 | B1 | 1/2007 | Walker et al. |
| 7,201,655 | B2 | 4/2007 | Walker et al. |
| 7,222,857 | B2 | 5/2007 | Moody |
| 7,222,858 | B2 | 5/2007 | Moody |
| 7,247,092 | B2 | 7/2007 | Jarvis |
| 7,297,057 | B2 | 11/2007 | Gerrard et al. |
| 7,354,344 | B2 | 4/2008 | Paulsen et al. |
| 7,387,568 | B2 | 6/2008 | Millerschone |
| 7,390,258 | B2 | 6/2008 | Millerschone |
| 7,393,276 | B2 | 7/2008 | Millerschone |
| 7,404,762 | B2 | 7/2008 | Moody |
| 7,416,186 | B2 | 8/2008 | Walker et al. |
| 7,419,162 | B2 | 9/2008 | Lancaster et al. |
| 7,431,644 | B2 | 10/2008 | Moody |
| 7,476,542 | B2 | 1/2009 | Walker et al. |
| 7,488,251 | B2 | 2/2009 | Kaminkow |
| 7,524,243 | B2 | 4/2009 | Bansemer et al. |
| 7,614,946 | B2 | 11/2009 | Nicely |
| 7,641,197 | B2 | 1/2010 | Jackson |
| 7,658,672 | B1 | 2/2010 | Wolf et al. |
| 7,748,714 | B2 | 7/2010 | Nicely et al. |
| 7,749,059 | B2 | 7/2010 | Tarantino |
| 7,749,061 | B2 | 7/2010 | Walker et al. |
| 7,771,274 | B2 | 8/2010 | Walker et al. |
| 7,785,188 | B2 | 8/2010 | Cannon |
| 7,803,041 | B2 | 9/2010 | Gold et al. |
| 7,803,043 | B2 | 9/2010 | Jackson |
| 7,815,500 | B2 | 10/2010 | Montross et al. |
| 7,837,545 | B2 | 11/2010 | Blair, Jr. et al. |
| 7,857,693 | B1 | 12/2010 | Johnson et al. |
| 7,862,417 | B2 | 1/2011 | Nicely |
| 7,867,073 | B2 | 1/2011 | Walker et al. |
| 7,914,369 | B2 | 3/2011 | Walker et al. |
| 7,918,724 | B2 | 4/2011 | Walker et al. |
| 7,922,571 | B2 | 4/2011 | Walker et al. |
| 7,993,191 | B2 | 8/2011 | Evans et al. |
| 2003/0070178 | A1 | 4/2003 | Boyd et al. |
| 2003/0073494 | A1 | 4/2003 | Kalpakian et al. |
| 2003/0130024 | A1 | 7/2003 | Darby |
| 2004/0017043 | A1 | 1/2004 | Moody |
| 2004/0036217 | A1 | 2/2004 | Schlumbrecht |
| 2004/0082384 | A1 | 4/2004 | Walker et al. |
| 2004/0132521 | A1 | 7/2004 | Peterson |
| 2004/0183254 | A1 | 9/2004 | Schlumbrecht |
| 2005/0116416 | A1 | 6/2005 | Peterson |
| 2005/0202863 | A1 | 9/2005 | Macaulay |
| 2005/0215300 | A1 | 9/2005 | Oliveras |
| 2006/0030403 | A1 | 2/2006 | Lafky |
| 2006/0135238 | A1 | 6/2006 | Lancaster et al. |
| 2007/0054721 | A1 | 3/2007 | Jackson |
| 2007/0135193 | A1 | 6/2007 | Nicely |
| 2007/0135194 | A1 | 6/2007 | Nicely et al. |
| 2008/0020815 | A1 | 1/2008 | Lancaster et al. |
| 2008/0064462 | A1 | 3/2008 | Gerrard et al. |
| 2008/0070674 | A1 | 3/2008 | Lancaster et al. |
| 2008/0076500 | A1 | 3/2008 | Lancaster et al. |
| 2008/0111309 | A1 | 5/2008 | Nicely et al. |
| 2008/0119257 | A1 | 5/2008 | Stern et al. |
| 2008/0133704 | A1 | 6/2008 | Kikinis |
| 2008/0188278 | A1 | 8/2008 | Paulsen et al. |
| 2008/0214255 | A1 | 9/2008 | Jarvis et al. |
| 2008/0254847 | A1 | 10/2008 | Millerschone |
| 2008/0280663 | A1 | 11/2008 | Shar et al. |
| 2009/0005144 | A1 | 1/2009 | Moody |
| 2009/0104962 | A1 | 4/2009 | Nicely et al. |
| 2009/0117959 | A1 | 5/2009 | Nicely |
| 2009/0121434 | A1 | 5/2009 | Baerlocher et al. |
| 2009/0124313 | A1 | 5/2009 | Nicely |
| 2009/0124316 | A1 | 5/2009 | Baerlocher et al. |
| 2009/0124334 | A1 | 5/2009 | Jones et al. |
| 2009/0181743 | A1 | 7/2009 | Bansemer et al. |
| 2009/0189351 | A1 | 7/2009 | Baerlocher et al. |
| 2010/0004051 | A1 | 1/2010 | Walker et al. |
| 2010/0035676 | A1 | 2/2010 | Nicely et al. |
| 2010/0099480 | A1 | 4/2010 | Caputo |
| 2010/0120484 | A1 | 5/2010 | Caputo et al. |
| 2010/0120514 | A1 | 5/2010 | Caputo |
| 2010/0144415 | A1 | 6/2010 | Wolf et al. |
| 2010/0227661 | A1 | 9/2010 | Walker et al. |
| 2010/0252997 | A1 | 10/2010 | Walker et al. |
| 2010/0289220 | A1 | 11/2010 | Jackson |
| 2010/0331068 | A1 | 12/2010 | Walker et al. |
| 2011/0003625 | A1 | 1/2011 | Montross et al. |
| 2011/0014963 | A1 | 1/2011 | Walker et al. |
| 2011/0111818 | A1 | 5/2011 | Baerlocher |
| 2012/0034970 | A1* | 2/2012 | Stephens ......................... 463/22 |

FOREIGN PATENT DOCUMENTS

| | | |
|---|---|---|
| CA | 2632291 | 7/2007 |
| EP | 1 968 720 | 7/2007 |
| EP | 2 360 031 | 8/2011 |
| WO | WO 99/64128 | 12/1999 |

(56) References Cited

FOREIGN PATENT DOCUMENTS

| | | |
|---|---|---|
| WO | WO 03/011407 | 2/2003 |
| WO | WO 2004/004853 | 1/2004 |
| WO | WO 2004/071601 | 8/2004 |
| WO | WO 2005/033825 | 4/2005 |
| WO | WO 2007/059310 | 5/2007 |
| WO | WO 2007/078372 | 7/2007 |
| WO | WO 2009/100582 | 8/2009 |

OTHER PUBLICATIONS iPoker Presents Speed Hold'em Poker, iPoker by playtech, available at http://www.ipoker.com/html/static/html/SpeedHoldem/, printed Jul. 2, 2013 (1 page).

Play Rush Poker*—the World's Fastest Poker Game!, Full Tilt Poker, available at http://www.fulltiltpoker.com/poker/game-types/rush, printed Jul. 2, 2013 (1 page).

Rapid Poker—Experience Playing Fast Fold Texas Holdem With Friends, AppShopper, available at http://appshopper.com/games/rapid-poker, printed Jul. 2, 2013 (2 pages).

Relax Gaming Fast Poker (FP), Relax Gaming, available at http://www.relax-gaming.com/products/relax-gaming-fast-poker-fp, printed Jul. 2, 2013 (2 pages).

Rush Poker*—FAQ, Full Tilt Poker, available at http://www.fulltiltpoker.com/poker/game-types/rush/faq, printed Jul. 2, 2013 (2 pages).

Rush Poker* Tournaments—FAQ, Full Tilt Poker, available at http://www.fulltiltpoker.com/poker/game-types/rush/tournaments-faq, printed Jul. 2, 2013 (2 pages).

Rush Poker* Tournaments, Full Tilt Poker, available at http://www.fulltiltpoker.com/poker/game-types/rush/tournaments, printed Jul. 2, 2013 (4 pages).

Rush Ring Games, Full Tilt Poker, available at http://www.fulltiltpoker.com/poker/game-types/rush/details, printed Jul. 2, 2013 (6 pages).

Terminal Poker by InstaDeal, Brochure, available at http://www.terminalpoker.net/uploads/pdf/BrochureTerminalPoker_en.pdf, printed Jul. 2, 2013 (6 pages).

* cited by examiner

GAMING SYSTEM AND METHOD PROVIDING A MULTIPLAYER CARD GAME WITH MULTIPLE FOLD OPTIONS AND INTERRELATED BONUSES

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker has become very popular. One of the most common variations of poker is Five Card Draw. In general, in Five Card Draw poker the player receives five cards dealt face up from a fifty-two card deck of playing cards. The player can discard none, one, a plurality, or all of the five cards. Each discarded card is replaced with another card from the deck. After the replacement (if any), the cards are evaluated for winning combinations. For a five card poker game, there are ten general categories of hands, ranked from highest to lowest, as shown in Table I below.

TABLE 1

Ranking of Five Card Poker Hands by Category

| Rank | Name | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four of a Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three of a Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

Within each category, hands are ranked according to the rank of individual cards, with an Ace being the highest card and a Two being the lowest card. There is no difference in rank between the four suits of cards. All hands can be ranked in a linear ranking from highest to lowest. Because suits are all of the same value, however, there are multiple hands that have identical rankings. For example, there are four equivalent hands for each type of Straight Flush, Four of a Kind, or Flush. There are over a hundred equivalent hands for each Two Pair variation, and there are over 1,000 equivalent hands for each type of no-pair hand.

Numerous variations of poker exist, including Five Card Draw as mentioned above, Three Card Poker, Five Card Stud, Seven Card Stud, Hold 'Em (also called Texas Hold 'Em), Omaha (also called Omaha Hold 'Em), and Pai-Gow Poker. These games generally differ in the manner in which cards are dealt and in the manner and frequency in which bets are placed. Various criteria may also be used to determine the winning hand, including the highest ranking hand, the lowest ranking hand (Low-Ball), and where the highest ranking and lowest ranking hands each win half of the pot (High-Low).

In certain known multiplayer variations of poker, players play against each other rather than against a dealer or house. In certain of these variations, a round of play begins when each player has placed an initial bet, which is typically referred to as the ante, into the pot. The term pot typically refers to the total accumulation of antes and wagers made during a particular game. In other poker variations, such as Texas Hold 'Em (described in further detail below), only two players at a table make the initial bets, which are commonly referred to as the blinds.

The quantity of cards dealt depends on the particular variation of poker being played. For example, in Five Card Draw, each player is initially dealt five cards. In typical Three Card Poker games where the player plays against a dealer hand, the player is dealt a total of three cards and the dealer hand includes a total of three cards as well. In certain known Three Card Poker games, the initially dealt player hand and dealer hand are final and there is no option to replace or draw any new cards. In Texas Hold 'Em, Five Card Stud and Seven Card Stud, each player is initially dealt two cards. These cards are typically dealt face-down. However, depending on the game, some of the cards may be dealt face-up to the player. For example, in Five Card Stud, each player is initially dealt one card face-up and one card face-down. In Texas Hold 'Em, each player is initially dealt two cards face-down, which are commonly referred to as the hole cards.

For certain poker variations in which additional cards are dealt or in which cards may be replaced, after the initial deal, a first round of wagering begins, in which the players have the opportunity to place wagers. If a player places a wager, that wager must be matched (i.e., called) or raised by each player that wants to remain in the game. A raise includes matching the previous wager and increasing the total bet. A player who does not match a bet drops out of the game or folds. A round of betting ends when either every player but one has folded, or when the highest bet or raise has been called by at least one remaining player such that each remaining player has wagered the same amount into the pot during the round.

Depending on the variation of poker being played, each game may have only an initial wager or several rounds of wagering, where each round of wagering is generally preceded by the dealing of one or more cards. A player wins a game of poker by being the last remaining player in the game after all other players have folded or by having the highest ranking hand when a showdown occurs. If two or more players remain after the final round of wagering is complete, a showdown occurs. During the showdown, each remaining player's hand is displayed, the highest ranking hand is determined to be the winning hand, and the pot is provided to the player having the winning hand. If two or more players have identically ranked hands that are the highest ranking hands, the pot is split evenly among the tying players.

Of the poker variations mentioned above, Texas Hold 'Em is one of the more popular versions. Texas Hold 'Em is generally a multi-player card game played at a live card table or via a computer-based virtual card table. In one version of a live card table game of Texas Hold 'Em, only two players at a table make the initial bets, commonly referred to as the blinds. The blinds include a big blind and a small blind. The big blind is typically twice the value of the small blind. In a blind-based game such as Texas Hold 'Em, all players are initially eligible to receive a hand, even if they do not place the big blind or the small blind. After the players have anted (if an ante is required), each player eligible for play is dealt an initial set of cards. Each of the players must match the blinds, raise the blinds or fold. Texas Hold 'Em includes a designated quantity of community cards (usually five) that can be used by all of the players in combination with their hole cards. However, in certain variations, there may only be three community cards. In certain Texas Hold 'Em games, the community cards are dealt over the course of several wagering rounds. For example, the gaming device or dealer deals the flop (usually three cards), the turn (usually one card), and the river (usually one card). The winning hand is the resulting five card hand (of the combined seven cards) having the highest poker rank. This method of determining a winning five card hand is similar to determining a winning hand in Seven Card Stud. However, Seven Card Stud does not utilize community cards as in Texas Hold 'Em. In other variations of Texas Hold 'Em, where the quantity of community cards is only three, the flop is a single card rather than three cards.

A need exists for new and exciting poker games offering a variety of bonuses to keep players engaged during game play, increase entertainment value, and encourage action at the poker tables.

SUMMARY

Various embodiments of the present disclosure are directed to a gaming system and method providing a multiplayer card game with multiple fold options and interrelated bonuses.

In one embodiment, the gaming system enables a player to input either a first fold input or a second different fold input should the player desire to fold the player's hand during a play of the card game. If the gaming system receives the first fold input from the player, the gaming system: (a) folds the player's hand, (b) automatically removes the player from the virtual table, and (c) automatically assigns the player to a second different virtual table for at least one subsequent play of the card game. If, on the other hand, the gaming system receives the second fold input from the player, the gaming system folds the player's hand and does not remove the player from the virtual table. Thus, in this embodiment, the gaming system provides players who desire to fold their hands a choice of either: (a) folding and automatically leaving their current virtual tables and automatically being seated at different virtual tables, or (b) folding and staying at their current virtual tables.

In another embodiment, for a play of the card game at a virtual table, the gaming system enables a player to input a fold input at any point in time during the play of the card game should the player desire to fold the player's hand. If the gaming system receives the fold input from the player, the gaming system folds the player's hand and subsequently enables the player to, at any point in time during the remainder of the play of the card game, choose to: (a) remain at the virtual table for at least one additional play of the card game, or (b) switch to a different virtual table for at least one play of the card game. In this embodiment, the player remains at the virtual table until the gaming system receives an input from the player indicating the player's desire to switch to a different virtual table, at which point the gaming system: (a) removes the player from the virtual table, and (b) assigns the player to a second different virtual table for at least one subsequent play of the card game. In this embodiment, the player remains at the virtual table if the gaming system does not receive an input from the player indicating the player's desire to switch to a different virtual table before the play of the card game is complete.

In other embodiments, the card game is associated with a table leader bonus award that the gaming system provides to a player who increments a streak value of a table leader streak counter associated with the player to at least a designated value by achieving one or more designated winning outcomes during a plurality of plays of the card game at a virtual table.

More specifically, in one embodiment, each of a plurality of players at a virtual table is associated with a separate table leader streak counter having a streak value. In this embodiment, the gaming system sets the streak value of a player's table leader streak counter to an initial streak value when the player joins the virtual table. In this embodiment, the streak value of the table leader streak counter of only one of the players at the virtual table may be greater than the initial streak value at any given point in time. The player (if any) whose table leader streak counter has a streak value greater than the initial streak value is referred to, labeled as, or assumes the role of the table leader of the virtual table.

For each play of the card game at the virtual table, the gaming system provides that play of the card game and determines an outcome of that play of the card game. If the determined outcome is the designated winning outcome for one of the players, the gaming system determines whether that player is the table leader. If that player is the table leader, the gaming system: (a) maintains that player as the table leader; (b) increments the table leader's table leader streak counter; and (c) if the streak value of the table leader's table leader streak counter is at least a designated value, determines a table leader bonus award based at least in part on the streak value of the table leader's table leader streak counter and provides any determined table leader bonus award to the table leader.

If the player for whom the determined outcome is the designated winning outcome is not the table leader, the gaming system determines whether any other player at the virtual table is the table leader. If one of the other players at the virtual table is the table leader, the gaming system: (a) replaces the other player with the player for whom the determined outcome is the designated winning outcome as table leader; (b) resets the former table leader's table leader streak counter to the initial streak value; (c) increments the current table leader's table leader streak counter; and (d) if the streak value of the current table leader's table leader streak counter is at least the designated value, determines a table leader bonus award based at least in part on the streak value of current table leader's table leader streak counter and provides any determined table leader bonus award to the current table leader.

In certain embodiments in which the card game is associated with the table leader bonus award, the card game is also associated with a streak buster bonus award. In these embodiments, the gaming system provides the streak buster bonus award to a player who replaces another player as the table leader.

In other embodiments, the card game is associated with a nemesis bonus award that the gaming system provides to a player who achieves a designated winning outcome over another player at least a designated quantity of times before that other player achieves the designated winning outcome over the player. It should be appreciated that each player has (or potentially has) his or her own unique nemesis (or nemeses); that is whether the gaming system provides the nemesis bonus award varies from player to player.

In one embodiment, for a first player at a virtual table of a plurality of players, the gaming system associates each other player with a first player nemesis counter, which tracks how close that other player is to becoming the first player's nemesis. When one of the other players achieves the designated winning outcome over the first player, the gaming system increments that other player's first player nemesis counter. On the other hand, when the first player achieves the designated winning outcome over one of the other players, the gaming system resets that other player's first player nemesis counter to an initial value. When the first player nemesis counter of one of the other players reaches a designated value, the gaming system labels that other player as a nemesis of the first player and provides that other player with the nemesis bonus award.

In certain embodiments in which the card game is associated with the nemesis bonus award, the card game is also associated with an avenged bonus award. In these embodiments, the gaming system provides the avenged bonus award to a player who achieves the designated winning outcome over a nemesis of that player.

In other embodiments, the card game is associated with a knockout bonus award that the gaming system provides to a player who wins all of the chips of another player (i.e., who beats that other player when that other player is "all-in").

It should thus be appreciated that the present disclosure provides a new and exciting poker game offering one or more bonuses that keep players engaged during game play, increase entertainment value, and encourage action at the poker tables.

Additional features and advantages are described herein, and will be apparent from, the following Detailed Description and the Figures.

BRIEF DESCRIPTION OF THE FIGURES

FIGS. 2A, 28, 2C, 2D, and 2E illustrate screen shots of an example embodiment of the gaming system of the present disclosure providing plays of the multiplayer card game with multiple fold options according to the method of FIG. 1A.

DETAILED DESCRIPTION

Figure 1A:
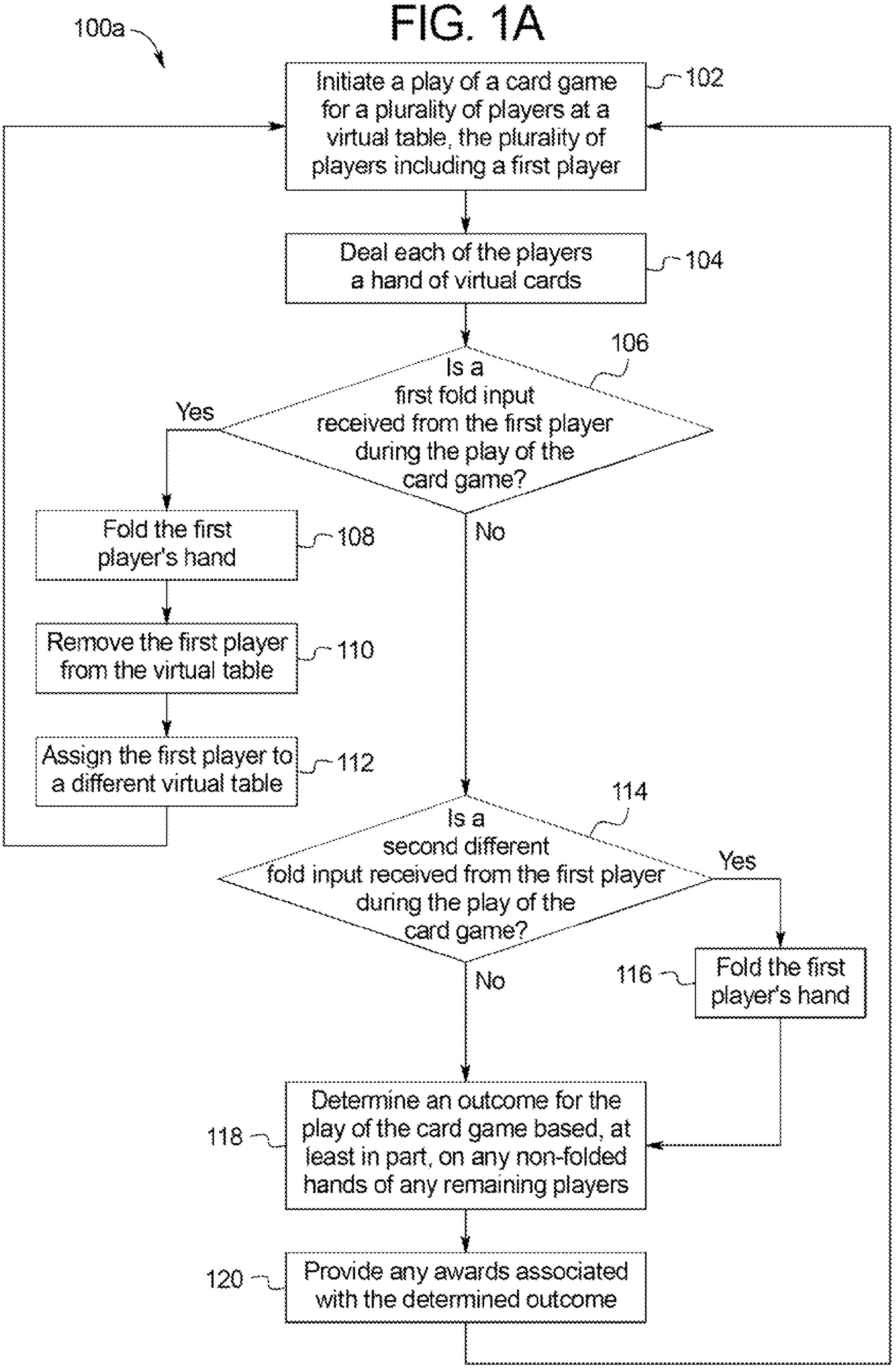
FIG. 1A is a flowchart illustrating a method of operating an example embodiment of the gaming system of the present disclosure configured to operate the multiplayer card game with multiple fold options.

Multiplayer Card Game with Multiple Fold Options and Interrelated Bonuses

Various embodiments of the present disclosure are directed to a gaming system and method providing a multiplayer card game with multiple fold options and interrelated bonuses. While the card game of the present disclosure is employed as a primary game in the embodiments described below, it should be appreciated that the game may additionally or alternatively be employed as or in association with a bonus game or a secondary game. Moreover, while any credit balances, any wagers, and any awards are displayed as amounts of monetary currency, credits, or "chips" representing monetary currency or credits in the embodiments described below, one or more of such credit balances, such wagers, and such awards may be for non-monetary credits, promotional credits, player tracking points or credits, or chips representing any thereof.

While the card game is No Limit Texas Hold 'Em in the example embodiments described below, it should be appreciated that the present disclosure contemplates employing any suitable type of card game instead of or in addition to Texas Hold 'Em, such as (but not limited to): Omaha Hi, Omaha Hi/Lo, Razz, Stud Hi, Stud Hi/Lo, Five Card Stud, Five Card Draw, Deuce to Seven Triple Draw, Deuce to Seven Single Draw, Ace to Five Triple Draw, and Badugi.

Generally, when the gaming system receives a request from a player to play the card game, such as when the player logs into the gaming system using a username and password and inputs a request to play the card game at a specific wager level, the gaming system adds the player to a queue or pool that includes other players who have requested to play the card game but who the gaming system has not yet assigned to a virtual table at which to play the card game. When the queue includes enough players to form a new virtual table, the gaming system forms a new virtual table including a designated number of the players in the queue (such as two players, six players, nine players, or ten players). Alternatively, when a seat at an already-formed virtual table is empty or becomes empty (such as when a player leaves that seat to discontinue play of the card game or to switch virtual tables), the gaming system picks one of the players from the queue and fills the empty seat at that virtual table with the picked player. Thus, the gaming system dynamically fills empty seats at existing virtual tables and/or dynamically creates new virtual tables based on need using players from the queue.

Once a plurality of players are seated at a virtual table, the gaming system provides a play of the card game for those players. More specifically, the gaming system deals each player one or more virtual cards; conducts one or more rounds of betting during which players may continue play (e.g., check, make a bet, call a bet, or make a raise) or fold; and determines an outcome for the play of the card game.

Multiple Fold Options

In various embodiments, the gaming system enables a player to input either a first fold input or a second different fold input should the player desire to fold the player's hand. If the gaming system receives the first fold input from the player, the gaming system: (a) folds the player's hand, (b) automatically removes the player from the virtual table, and (c) automatically assigns the player to a second different virtual table for at least one subsequent play of the card game (such as by adding the player back into the queue and forming a new virtual table including the player or filling an empty seat at another virtual table with the player, as described above). If, on the other hand, the gaming system receives the second fold input from the player, the gaming system folds the player's hand and does not remove the player from the virtual table. It should thus be appreciated that, in these embodiments, the gaming system provides players who desire to fold their hands a choice of either: (a) folding and automatically leaving their current virtual tables and automatically being seated at different virtual tables, or (b) folding and staying at their current virtual tables.

In one embodiment, the gaming system enables a player to make the first fold input at any point in time during game play at which the player's hand is still in play (i.e., not yet folded) and the player is not leading a round of betting. This provides a player who desires to fold the ability to do so as quickly as possible, join another virtual table as quickly as possible, and participate in another play of the card game as quickly as possible. In other words, this enables the player to avoid waiting for the play of the card game at the player's current virtual table to finish before participating in another play of the card game. In another embodiment, the gaming system enables a player to make the first fold input when it is the player's turn to act.

FIG. 1A illustrates a flowchart of an example process or method 100*a* of operating one such gaming system of the present disclosure from the perspective of one of a plurality of players of the card game at a virtual table. In various embodiments, process 100*a* is represented by a set of instructions stored in one or more memories and executed by one or more processors. Although process 100*a* is described with reference to the flowchart shown in FIG. 1A, it should be appreciated that many other processes of performing the acts associated with this illustrated process 100*a* may be employed. For example, the order of certain of the illustrated blocks and/or diamonds may be changed, certain of the illustrated blocks and/or diamonds may be optional, and/or certain of the illustrated blocks and/or diamonds may not be employed.

In this example embodiment, the gaming system initiates a play of the card game for the plurality of players at the virtual table, as indicated by block 102. The plurality of players includes a first player. The gaming system deals each of the players a hand of virtual cards, as indicated by block 104. The gaming system determines if a first fold input is received from the first player during the play of the card game, as indicated by diamond 106. If the gaming system receives the first fold input from the first player during the play of the card game, the gaming system: (a) folds the first player's hand, as indicated by block 108; (b) removes the first player from the virtual table, as indicated by block 110; and (c) assigns the first player to a different virtual table, as indicated by block 112. Process 100*a* then returns to block 102 to repeat process 100*a* for another play of the card game including the first player at the different virtual table.

If the gaming system does not receive the first fold input from the first player during the play of the card game, the gaming system determines if a second different fold input is received from the first player during the play of the card game, as indicated by diamond 114. If the gaming system receives the second fold input from the first player during the play of the card game, the gaming system folds the first player's hand, as indicated by block 116, and process 100*a* proceeds to block 118, described below. That is, if the gaming system receives the second fold input from the first player, the gaming system folds the first player's hand and does not remove the first player from the virtual table.

If the gaming system does not receive the second fold input from the first player during the play of the card game, the gaming system determines an outcome of the play of the card game based, at least in part, on any non-folded hands of any remaining players, as indicated by block 118. The gaming system provides any awards associated with the determined outcome, as indicated by block 120, and process 100*a* returns to block 102 for another play of the card game at the virtual table.

In other embodiments, for a play of the card game at a virtual table, the gaming system enables a player to input a fold input at any point in time during the play of the card game should the player desire to fold the player's hand. If the gaming system receives the fold input from the player, the gaming system folds the player's hand and subsequently enables the player to, at any point in time during the remainder of the play of the card game, choose to: (a) remain at the virtual table for at least one additional play of the card game, or (b) switch to a different virtual table for at least one play of the card game. In this embodiment, the player remains at the virtual table until the gaming system receives an input from the player indicating the player's desire to switch to a different virtual table, at which point the gaming system: (a) removes the player from the virtual table, and (b) assigns the player to a second different virtual table for at least one subsequent play of the card game (such as by adding the player back into the queue and forming a new virtual table including the player or filling an empty seat at another virtual table with the player, as described above). In this embodiment, the player remains at the virtual table if the gaming system does not receive an input from the player indicating the player's desire to switch to a different virtual table before the play of the card game is complete.

Figure 1B:
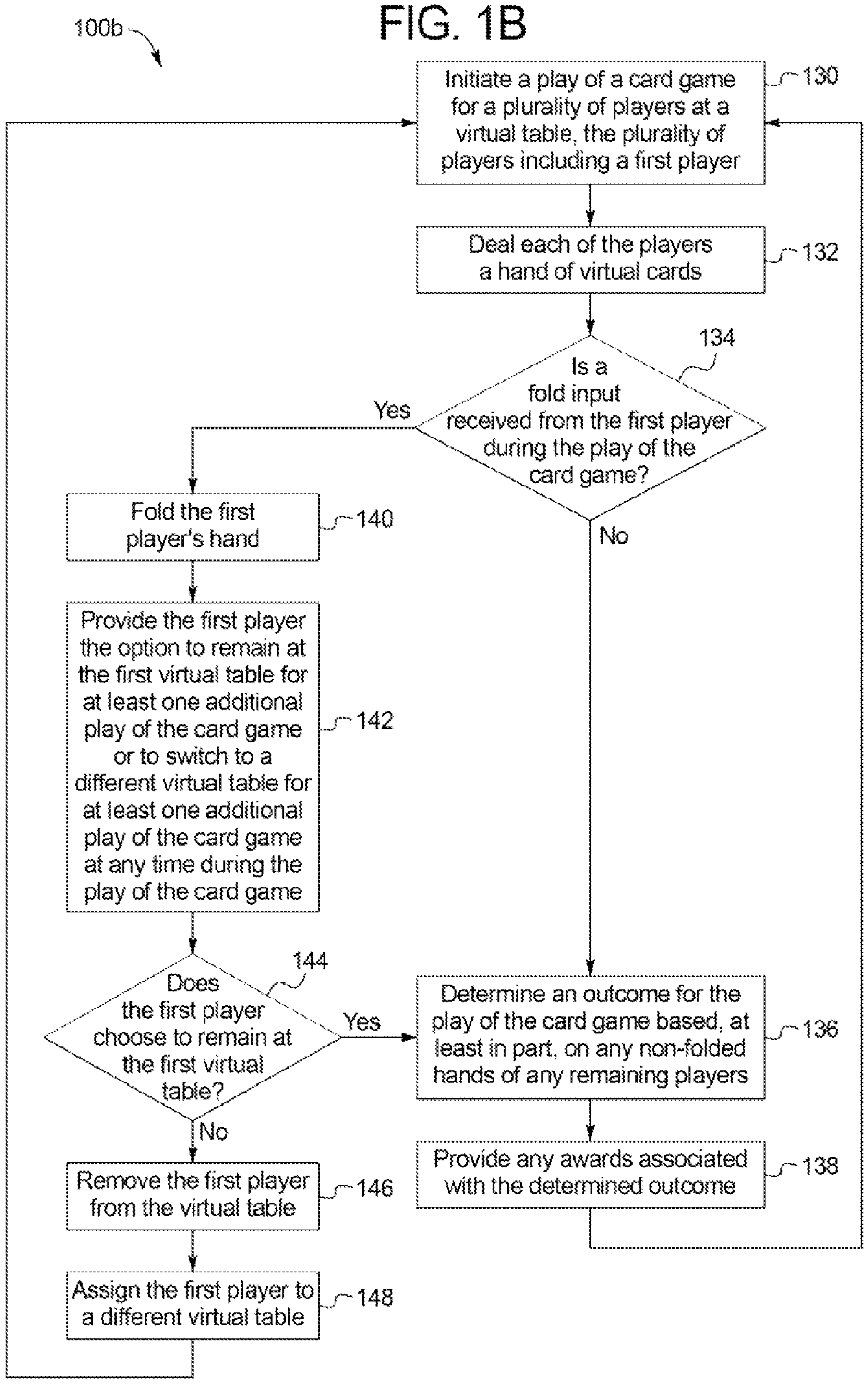
FIG. 1B is a flowchart illustrating a method of operating another example embodiment of the gaming system of the present disclosure configured to operate the multiplayer card game with multiple fold options.

FIG. 1B illustrates a flowchart of another example process or method 100 of operating one such gaming system of the present disclosure from the perspective of one of a plurality of players of the card game at a virtual table. In various embodiments, process 100*b* is represented by a set of instructions stored in one or more memories and executed by one or more processors. Although process 100*b* is described with reference to the flowchart shown in FIG. 1B, it should be appreciated that many other processes of performing the acts associated with this illustrated process 100*b* may be employed. For example, the order of certain of the illustrated blocks and/or diamonds may be changed, certain of the illustrated blocks and/or diamonds may be optional, and/or certain of the illustrated blocks and/or diamonds may not be employed.

In this example embodiment, the gaming system initiates a play of the card game for the plurality of players at the virtual table, as indicated by block 130. The plurality of players includes a first player. The gaming system deals each of the players a hand of virtual cards, as indicated by block 132. The gaming system determines if a fold input is received from the first player during the play of the card game, as indicated by diamond 134. If the gaming system does not receive the fold input from the first player during the play of the card game, the gaming system determines an outcome for the play of the card game based, at least in part, on any non-folded hands of any remaining players, as indicated by block 136. The gaming system provides any awards associated with the determined outcome, as indicated by block 138, and process 100*b* returns to block 130 for another play of the card game at the virtual table.

If, on the other hand, the gaming system receives the fold input from the first player during the play of the card game, the gaming system: (a) folds the first player's hand, as indicated by block 140; and (b) provides the first player the option to either remain at the first virtual table for at least one additional play of the card game or to switch to a different virtual table for at least one additional play of the card game, as indicated by block 142. It should be appreciated that, in this example embodiment, the gaming system provides the player this choice at all times during the remainder of the play of the card game after the gaming system receives the fold input from the player. In other words, the gaming system enables the player (whose hand has been folded) to choose to stay at or leave the virtual table at any point in time during the play of the card game after receiving the fold input from the first player until the play is complete.

The gaming system determines whether the first player chooses to remain at the first virtual table, as indicated by diamond 144. If the gaming system determines that the first player has chosen to remain at the virtual table, process 100*b* proceeds to block 136, described above. If, on the other hand, the gaming system determines that the first player has not chosen to remain at the virtual table, the gaming system: (a) removes the first player from the virtual table, as indicated by block 146; and (b) assigns the first player to a different virtual table, as indicated by block 148. Process 100*b* then returns to block 130 to repeat process 100*b* for another play of the card game including the first player at the different virtual table.

FIGS. 2A, 2B, 2C, 2D, and 2E illustrate screen shots of one example embodiment of the gaming system of the present disclosure providing plays of the card game from the perspective of a specific player in accordance with process 100*a* described above with respect to FIG. 1A. As noted above, in this example embodiment the card game is Texas Hold 'Em.

Figure 2A:
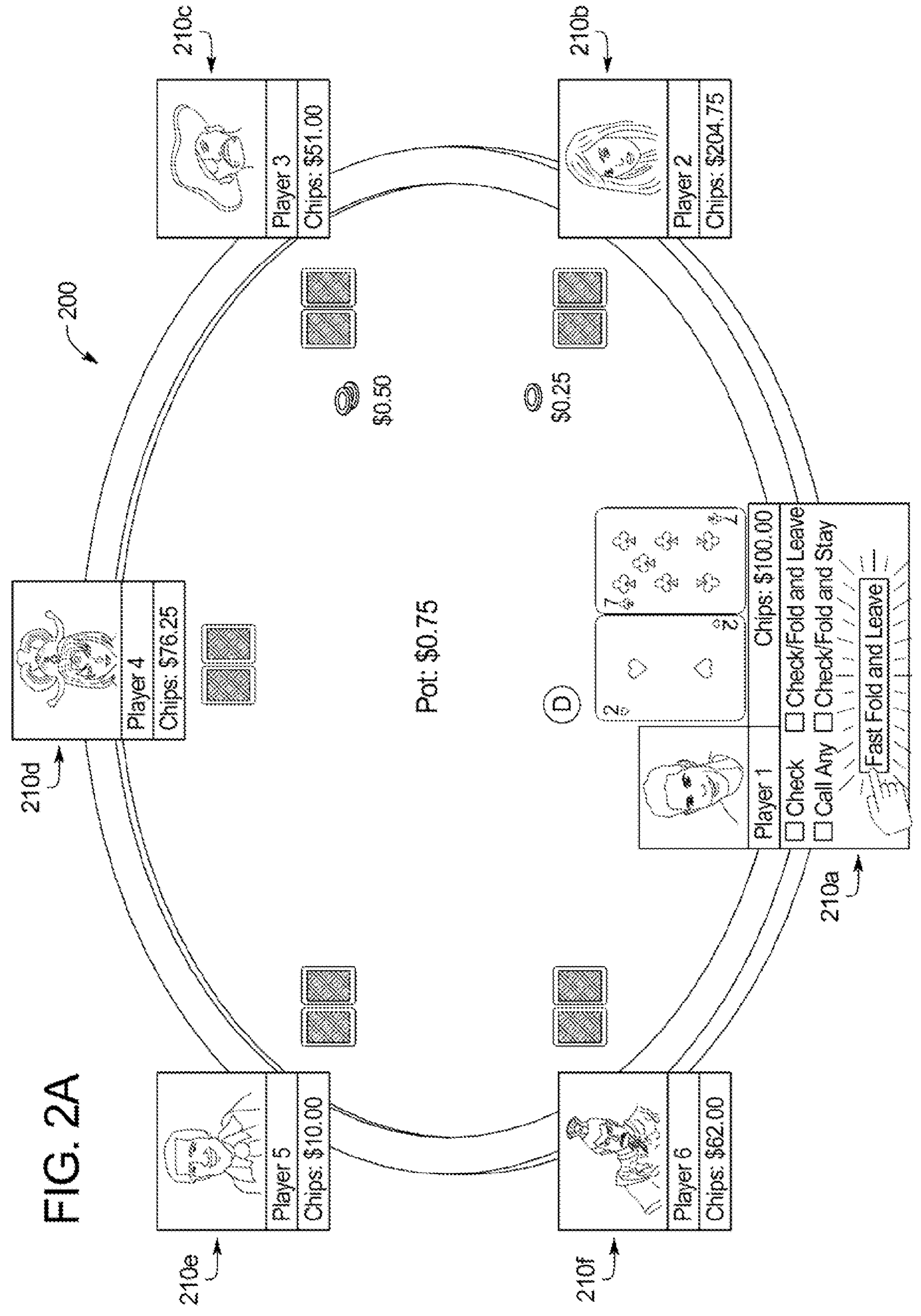

As illustrated in FIG. 2A, the gaming system initiates a play of the card game for a plurality of players, each of which is seated at one of a plurality of seats 210*a*, 210*b*, 210*c*, 210*d*, 210*e*, and 210*f* at a virtual table 200. More specifically, Player 1 is seated at seat 210*a*, Player 2 is seated at seat 210*b*, Player 3 is seated at seat 210*c*. Player 4 is seated at seat 210*d*, Player 5 is seated at seat 210*e*, and Player 6 is seated at seat 210*f*. The gaming system deals each of the players a hand of two virtual cards. In this example embodiment, this play of the card game is shown from the perspective of Player 1; therefore, the gaming system displays Player I's virtual hand of 2♥ 7♣.

In this example embodiment, before each player's turn to act (i.e., before it is that player's turn to decide whether to check, make a bet, call a bet, make a raise, or fold), the gaming system enables that player to: (a) provide the first fold input; (b) provide one of a plurality of different instructions for the gaming system to automatically execute when it becomes that player's turn to act (e.g., an instruction for the gaming system to check, call any bet, check if no additional bets are made or provide the first fold input if any additional bets are made, or check if no additional bets are made or provide the second fold input if any additional bets are made); or (c) do neither and wait until it is that player's turn to act.

Figure 2B:
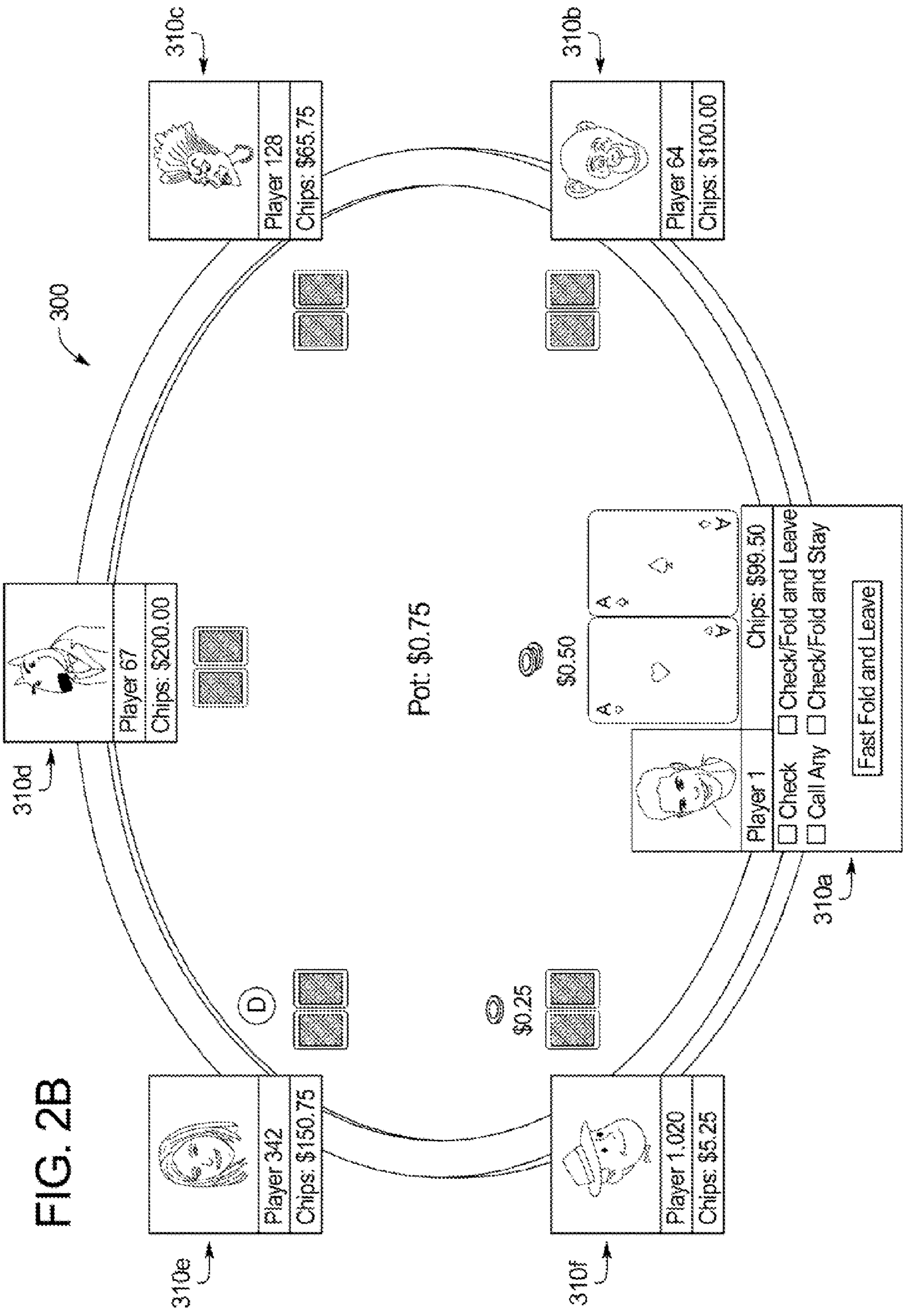

In this example, before it is Player 1's turn to act, the gaming system receives the first fold input from Player 1. Accordingly, the gaming system: (a) folds Player 1's virtual hand; (b) removes Player 1 from seat 210*a* of the virtual table 200: and (c) as shown in FIG. 2B, assigns Player 1 to empty seat 310*a* of a different virtual table 300 (such as by adding Player 1 back into the queue of players and subsequently picking Player 1 to fill empty seat 310*a*). The virtual table 300 includes Player 64 seated at seat 310*b*; Player 128 seated at seat 310*c*; Player 67 seated at seat 310*d*; Player 342 seated at seat 310*e*; and Player 1,020 seated at seat 310*f*. As illustrated in FIG. 2B, the gaming system initiates a play of the card game for the players at virtual table 300 and deals each of the players a hand of two virtual cards. Since this play of the card game is shown from the perspective of Player 1, the gaming system displays Player 1's virtual hand of A♥ A♣.

Figure 2C:
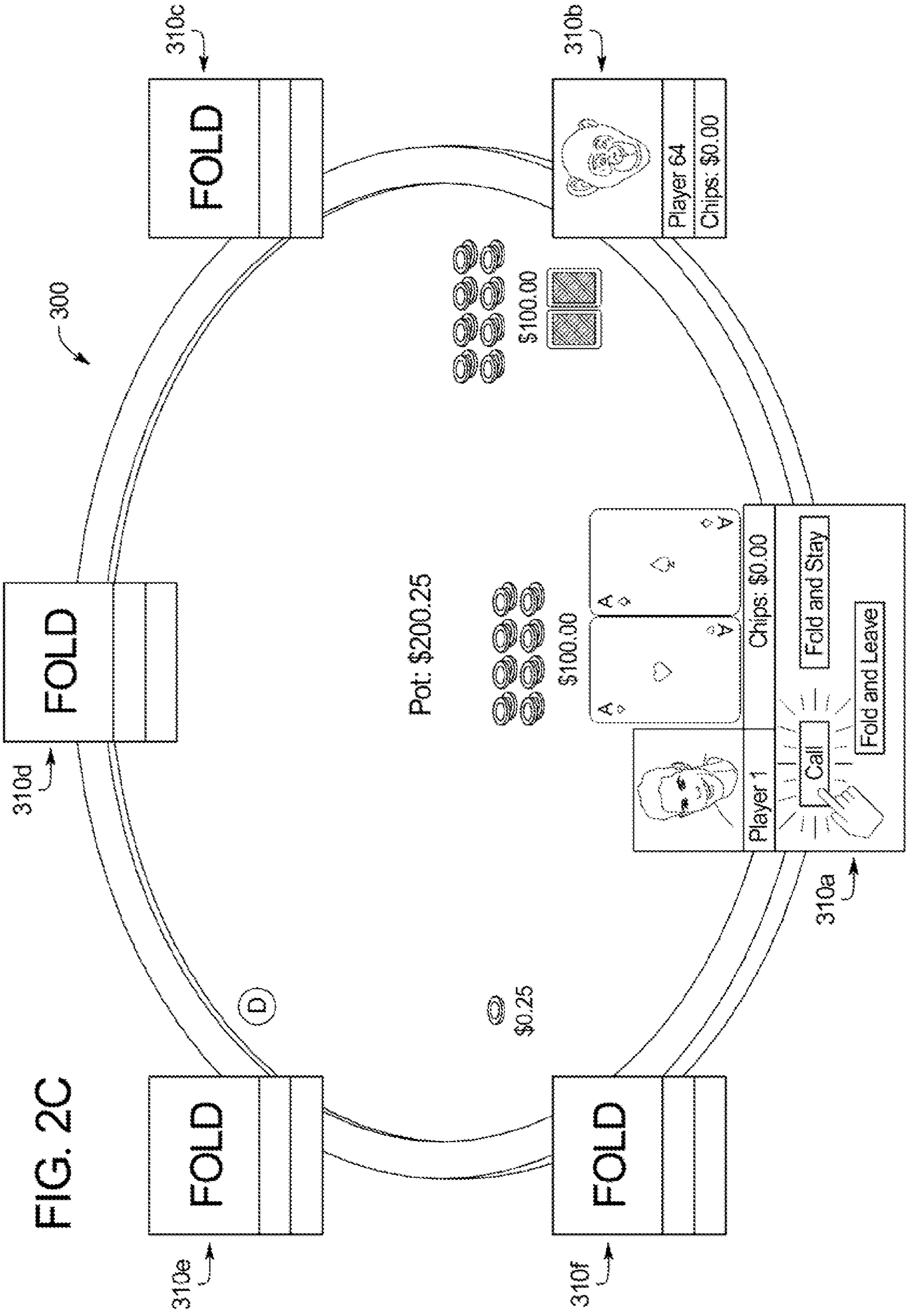

The gaming system does not receive the first fold input or any instructions from Player 1 before Player 1's turn to act. As illustrated in FIG. 2C, when it is Player 1's turn to act, the gaming system has received a bet of $100.00 from Player 64 and has received the first fold input from Players 128; 67; 342; and 1,020. Accordingly, the gaming system folded the virtual hands of Players 128; 67; 342; and 1,020 and removed those players from their respective seats at the virtual table 300. The gaming system receives a call input from Player 1 to call Player 64's $100.00 bet.

Figure 2D:
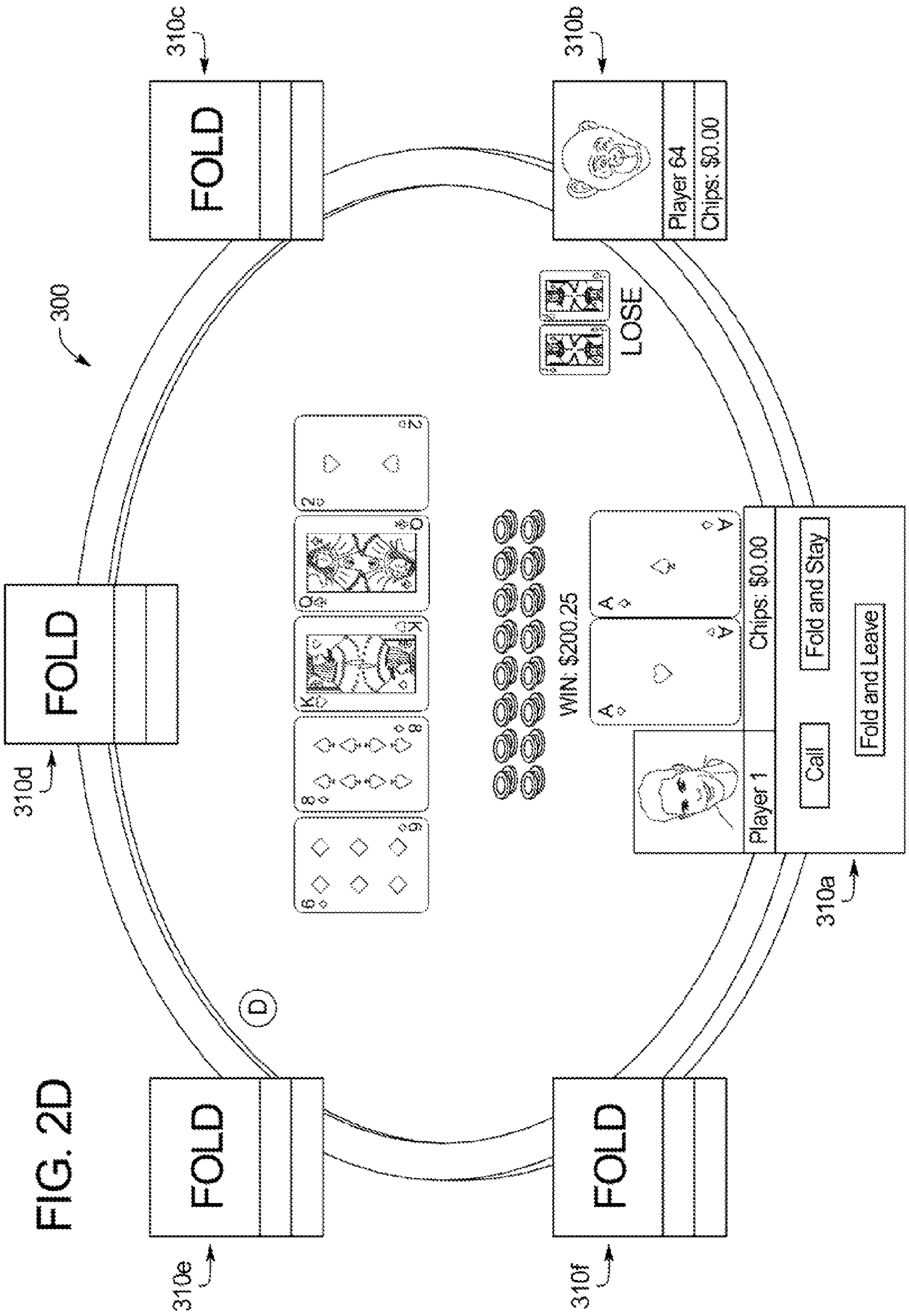

As illustrated in FIG. 2D, the gaming system determines an outcome for the play of the card game, which includes a showdown win for Player 1 and a showdown loss for Player 64, and provides the $200.25 pot (i.e., the award in this example embodiment) to Player 1.

Figure 2E:
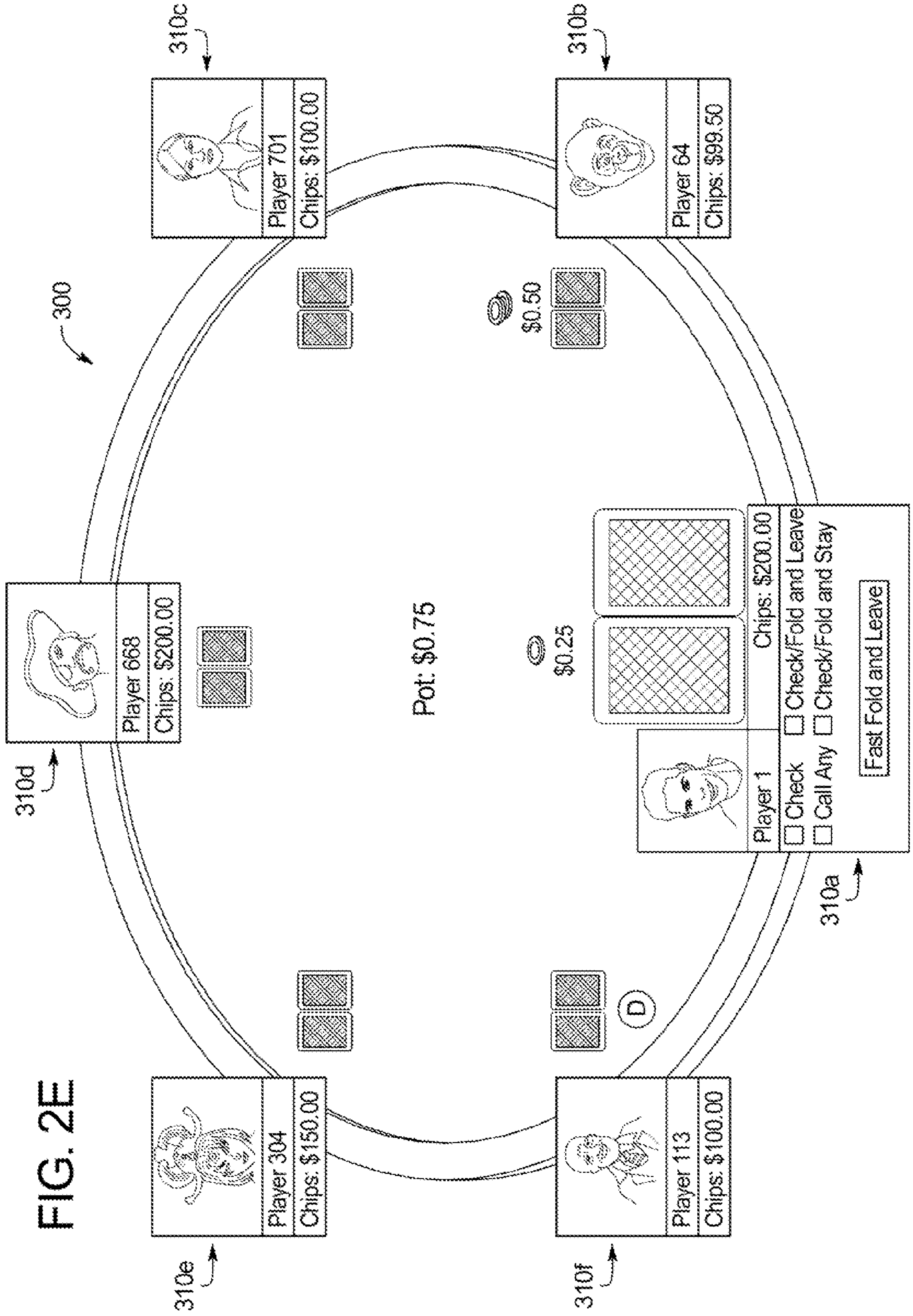

As illustrated in FIG. 2E, the gaming system assigns new players to each of the empty seats at the virtual table 300 (such as by selecting players from the queue) as follows: Player 701 at seat 310*c*, Player 668 at seat 310*d*, Player 304 at seat 310*e*, and Player 113 at seat 310*f*. The gaming system also receives a rebuy input from Player 64 and provides Player 64 with $100.00 in chips.

Table Leader Bonus Award

In certain embodiments, the card game is associated with a table leader bonus award that the gaming system provides to a player who increments a streak value of a table leader streak counter associated with the player to at least a designated value by achieving one or more designated winning outcomes during a plurality of plays of the card game at a virtual table.

More specifically, in one embodiment, each of a plurality of players at a virtual table is associated with a separate table leader streak counter having a streak value. In this embodiment, the gaming system sets the streak value of a player's table leader streak counter to an initial streak value when the player joins the virtual table. In this embodiment, the streak value of the table leader streak counter of only one of the players at the virtual table may be greater than the initial streak value at any given point in time. The player (if any) whose table leader streak counter has a streak value greater than the initial streak value is referred to, labeled as, or assumes the role of the table leader of the virtual table.

For each play of the card game at the virtual table, the gaming system provides that play of the card game and determines an outcome of that play of the card game (as generally described above). In this embodiment, if the determined outcome is not a designated winning outcome for any of the players, the gaming system does not modify any of the players' table leader streak counters.

If the determined outcome is the designated winning outcome for one of the players, the gaming system determines whether that player is the table leader. If that player is the table leader (i.e., if the streak value of that player's table leader streak counter is greater than the initial streak value), the gaming system: (a) maintains that player as the table leader; (b) increments the table leader's table leader streak counter and (c) if the streak value of the table leader's table leader streak counter is at least a designated value, determines a table leader bonus award based at least in part on the streak value of the table leader's table leader streak counter and provides any determined table leader bonus award to the table leader.

If the player for whom the determined outcome is the designated winning outcome is not the table leader, the gaming system determines whether any other player at the virtual table is the table leader. If one of the other players at the virtual table is the table leader, the gaming system: (a) replaces the other player with the player for whom the determined outcome is the designated winning outcome as table leader: (b) resets the former table leader's table leader streak counter to the initial streak value; (c) increments the current table leader's table leader streak counter; and (d) if the streak value of the current table leader's table leader streak counter is at least the designated value, determines a table leader bonus award based at least in part on the streak value of current table leader's table leader streak counter and provides any determined table leader bonus award to the current table leader.

If no player at the virtual table is the table leader, the gaming system: (a) makes the player for whom the determined outcome is the designated winning outcome the table leader; (b) increments the table leader's table leader streak counter, and (c) if the streak value of the table leader's table leader streak counter is at least a designated value, determines a table leader bonus award based at least in part on the streak value of the table leader's table leader streak counter and provides any determined table leader bonus award to the table leader.

In this embodiment, if a player leaves the virtual table (such as to stop playing the card game or to move to a different virtual table for at least one play of the card game), the gaming system resets that player's table leader streak counter to the initial streak value. Put differently, in this embodiment, each player's table leader streak counter persists as long as that player remains at the same virtual table, and does not transfer from virtual table to virtual table or from gaming session to gaming session.

It should be appreciated that the table leader bonus award encourages the table leader of a virtual table to remain at that virtual table and continue playing the card game to attempt to continue achieving the designated winning outcome as many times as possible to increment the player's table leader streak counter, maintain the player's table leader status, and win one or more table leader bonus awards before another player at the virtual table replaces that player as the table leader.

In various embodiments, the designated winning outcome is: (a) any winning outcome, (b) any winning outcome after the gaming system displays the flop, (c) any winning outcome after the gaming system displays the turn, (d) any winning outcome after the gaming system displays the river, (e) any winning outcome after betting is completed, or (f) any showdown win.

In one embodiment, the table leader bonus award is equal to: ((Streak Value of the Table Leader's Table Leader Streak Counter)−1)*(Big Blind Amount)*(N). The variable N is greater than or equal to one, and is a modifier used to adjust the value of the table leader bonus award in certain instances. For example, the value of the variable N may be increased during a certain time period within a day or during a certain day within a week to provide players a greater incentive to play the card game within those periods. It should be appreciated that the variable N may be determined in any suitable manner, and that the table leader bonus award may be determined in any other suitable manner.

Table Leader Bonus Award and Streak Buster Bonus Award

In certain embodiments in which the card game is associated with the table leader bonus award, the card game is also associated with a streak buster bonus award. In these embodiments, the gaming system provides the streak buster bonus award to a player who replaces another player as the table leader.

In one embodiment, for each play of the card game at the virtual table, the gaming system provides that play of the card game and determines an outcome of that play of the card game (as generally described above). If the determined outcome is a designated winning outcome for one of the players, and if another one of the players at the virtual table is the table leader, the gaming system: (a) replaces the other player with the player for whom the determined outcome is the designated winning outcome as the table leader, (b) resets the former table leader's table leader streak counter to the initial streak value; (c) increments the current table leader's table leader streak counter, (d) if the streak value of the current table leader's table leader streak counter is at least the designated value, determines a table leader bonus award based at least in part on the streak value of current table leaders table leader streak counter and provides any determined table leader bonus award to the current table leader; and (e) determines a streak buster bonus award and provides the determined streak buster bonus award to the current table leader.

It should be appreciated that the streak buster bonus award encourages players who are not currently the table leader of a virtual table to remain at that virtual table and continue playing the card game to attempt to obtain the designated winning outcome to replace the current table leader and win a streak buster bonus award for doing so.

In one embodiment, the streak buster bonus award is equal to: (Big Blind Amount)*(M)*(N). The variable N is described above. In this embodiment, the variable M is determined based on the steak value of the former table leader's table leader streak counter before it is reset to the initial streak value. For instance, the value of the variable M (and, therefore the value of the streak buster bonus award) increases as the streak value of the table leader streak counter of the former table leader increases. In one example, the value of the variable M is equal to the streak value of the former table leader's streak counter before it is reset to the initial streak value such that the gaming system provides a larger streak buster bonus award to a player who replaces a table leader having a table leader streak having a streak value of five than the gaming system provides to a player who replaces a table leader having a table leader streak having a streak value of two.

In another example, the value of the variable M increases when the streak value of the table leader streak of the former table leader meets a designated threshold. For instance, the variable M has a value of one if the streak value of the former table leader's streak counter is below three, a value of two if the streak value of the former table leader's streak counter is three to five, and a value of three if the streak value of the former table leader's streak counter is greater than five, a It should be appreciated that the streak buster bonus award may be determined in any other suitable manner.

In one embodiment, the gaming system provides the streak buster bonus award if the streak value of the table leader streak counter of the former table leader is at least a designated value before it is reset to the initial streak value.

Figure 3:
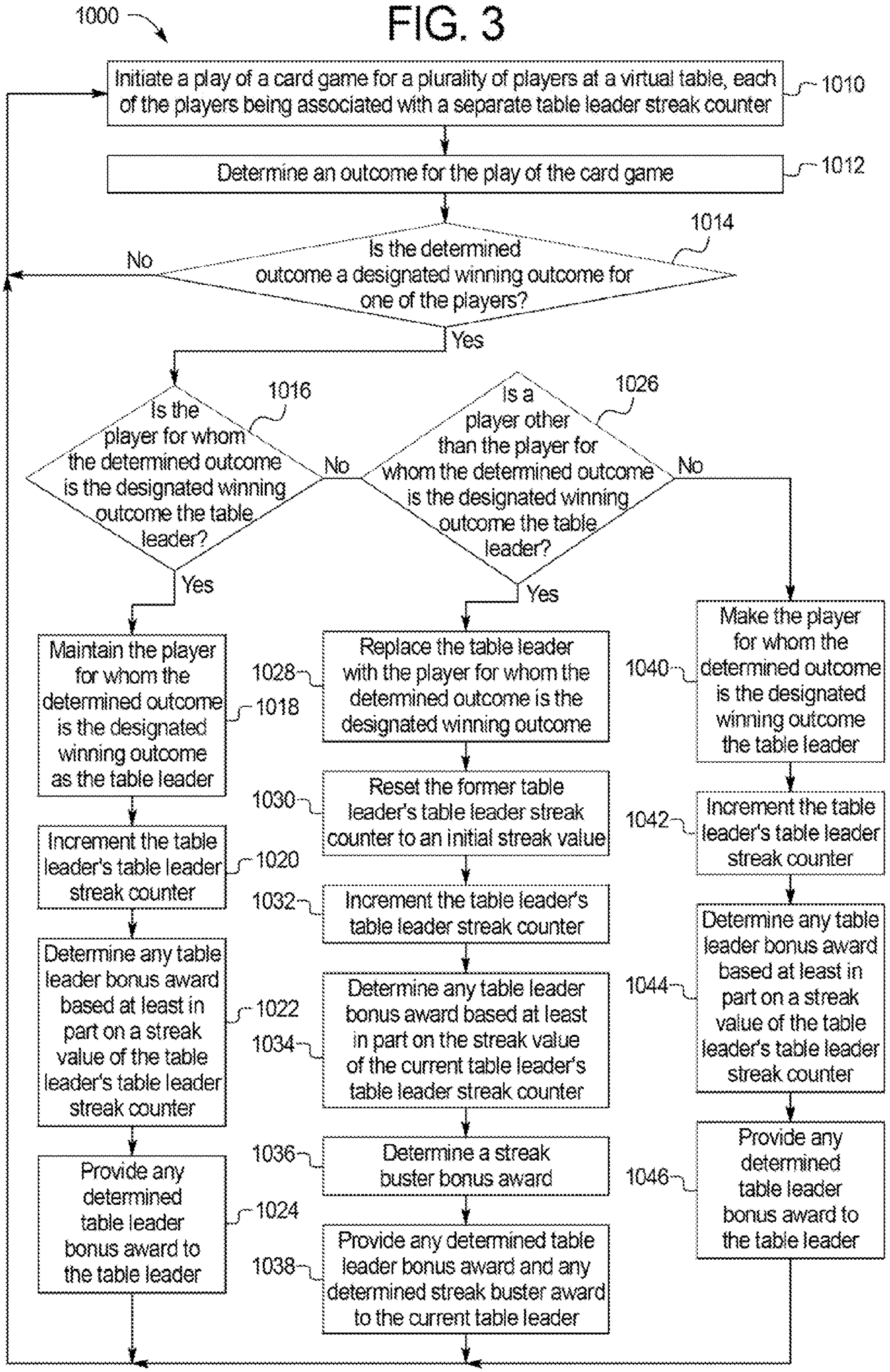
FIG. 3 is a flowchart illustrating a method of operating another example embodiment of the gaming system of the present disclosure configured to operate the multiplayer card game with multiple fold options and available table leader and streak buster bonuses.

FIG. 3 illustrates a flowchart of an example process or method 1000 of operating one such example embodiment of the gaming system of the present disclosure. In various embodiments, process 1000 is represented by a set of instructions stored in one or more memories and executed by one or more processors. Although process 1000 is described with reference to the flowchart shown in FIG. 3, it should be appreciated that many other processes of performing the acts associated with this illustrated process 1000 may be employed. For example, the order of certain of the illustrated blocks and/or diamonds may be changed, certain of the illustrated blocks and/or diamonds may be optional, and/or certain of the illustrated blocks and/or diamonds may not be employed.

In this example embodiment, the gaming system initiates a play of the card game for a plurality of players at a virtual table, as indicated by block 1010. Each of the players is associated with a separate table leader streak counter. The gaming system determines an outcome for the play of the card game, as indicated by block 1012. The gaming system determines whether the determined outcome is a designated winning outcome for one of the players, as indicated by diamond 1014. If the gaming system determines that the determined outcome is not the designated winning outcome for any of the players, process 1000 returns to block 1010 for another play of the card game.

If, on the other hand, the gaming system determines that the determined outcome is the designated winning outcome for one of the players, the gaming system determines whether the player for whom the determined outcome is the designated winning outcome is the table leader of the virtual table, as indicated by diamond 1016. If the gaming system determines that the player for whom the determined outcome is the designated winning outcome is the table leader of the virtual table, the gaming system: (a) maintains the player for whom the determined outcome is the designated winning outcome as the table leader, as indicated by block 1018; (b) increments the table leader's table leader streak counter, as indicated by block 1020; (c) determines any table leader bonus award based at least in part on a streak value of the table leader's table leader streak counter, as indicated by block 1022; and (d) provides any determined table leader bonus award to the table leader, as indicated by block 1024. Process 1000 returns to block 1010 for another play of the card game.

If, on the other hand, the gaming system determines that the player for whom the determined outcome is the designated winning outcome is not the table leader of the virtual table, the gaming system determines whether a player other than the player for whom the determined outcome is the designated winning outcome is the table leader, as indicated by diamond 1026. If the gaming system determines that a player other than the player for whom the determined outcome is the designated winning outcome is the table leader, the gaming system: (a) replaces the table leader with the player for whom the determined outcome is the designated winning outcome, as indicated by block 1028; (b) resets the former table leader's table leader streak counter to an initial streak value, as indicated by block 1030; (c) increments the table leader's table leader streak counter, as indicated by block 1032; (d) determines any table leader bonus award based at least in part on the streak value of the current table leader's table leader streak counter, as indicated by block 1034; (e) determines a streak buster bonus award, as indicated by block 1036; and (f) provides any determined table leader bonus award and any determined streak buster bonus award to the current table leader, as indicated by block 1038. Process 1000 returns to block 1010 for another play of the card game.

If, on the other hand, the gaming system determines that no player at the virtual table is the table leader, the gaming system: (a) makes the player for whom the determined outcome is the designated winning outcome the table leader, as indicated by block 1040; (b) increments the table leader's table leader streak counter, as indicated by block 1042; (c) determines any table leader bonus award based at least in part on the streak value of the table leader's table leader streak counter, as indicated by block 1044; and (d) provides any determined table leader bonus award to the table leader, as indicated by block 1046. Process 1000 returns to block 1010 for another play of the card game.

FIGS. 4A, 4B, 4C, and 4D illustrate screen shots of one example embodiment of the gaming system of the present disclosure providing plays of the card game in which a table leader bonus award and a streak buster bonus award are available to be won in certain instances. As noted above, in this example embodiment the card game is Texas Hold 'Em.

Figure 4A:
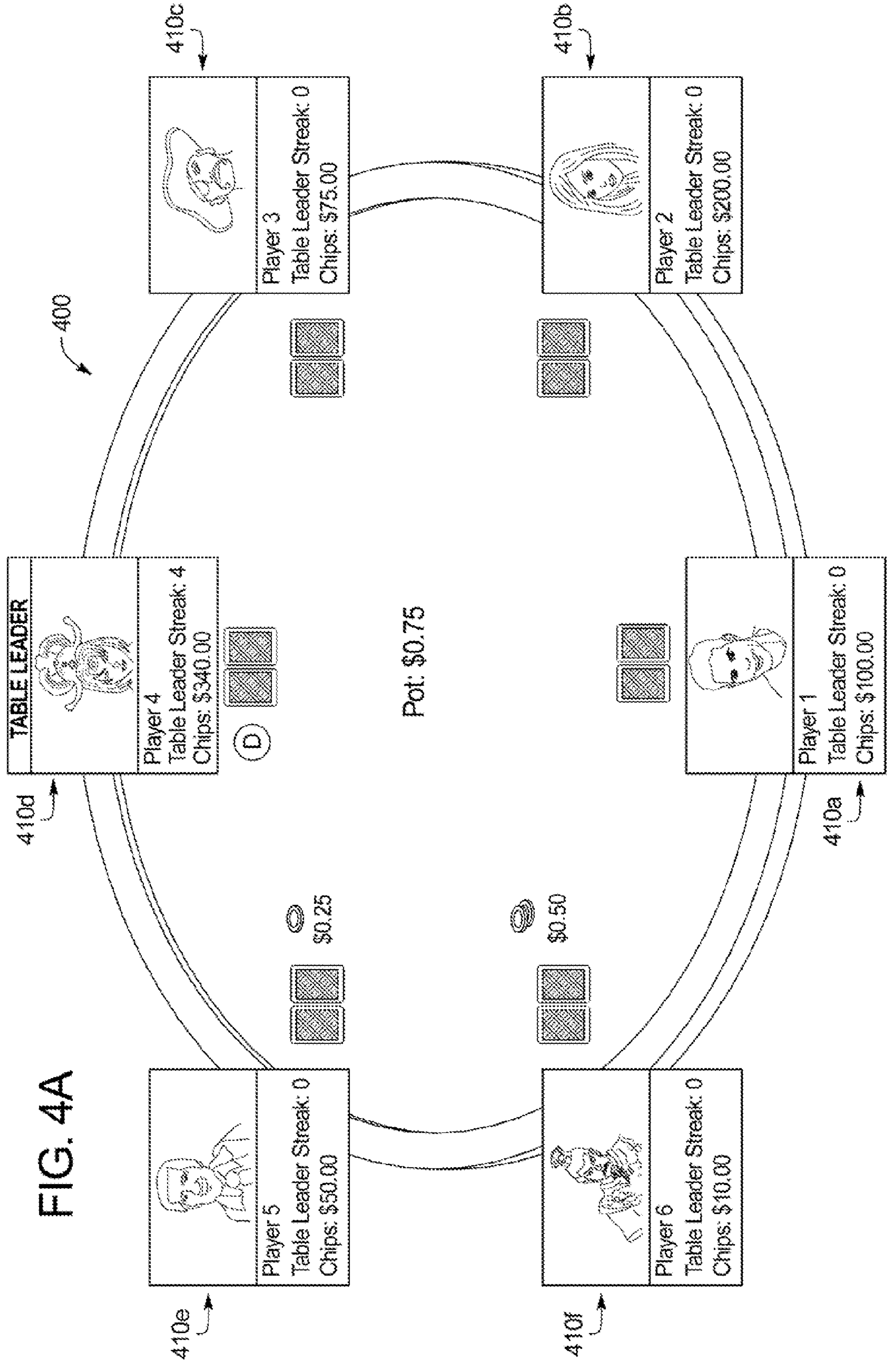
FIGS. 4A, 4B, 4C, and 4D illustrate screen shots of another example embodiment of the gaming system of the present disclosure providing plays of the multiplayer card game with multiple fold options and available table leader and streak buster bonuses according to the methods of FIGS. 1A and 3.

As illustrated in FIG. 4A, the gaming system initiates a play of the card game for a plurality of players, each of which is seated at one of a plurality of seats 410*a*, 410*b*, 410*c*, 410*d*, 410*e*, and 410*f* at a virtual table 400. More specifically. Player 1 is seated at seat 410*a*, Player 2 is seated at seat 410*b*, Player 3 is seated at seat 410*c*, Player 4 is seated at seat 410*d*, Player 5 is seated at seat 410*e*, and Player 6 is seated at seat 410*f*. Each of the players is associated with a separate table leader streak counter having a streak value. At this point in time, Player 4's table leader streak counter has a streak value of four and the remaining players' table leader streak counters each have a streak value of zero, which is the initial streak value in this example embodiment. Since Player 4's table leader streak counter is the only table leader streak counter having a streak value greater that the initial streak value of zero, Player 4 is the table leader at this point in time, and the gaming system displays any suitable indication identifying Player 4 as the table leader.

Figure 4B:
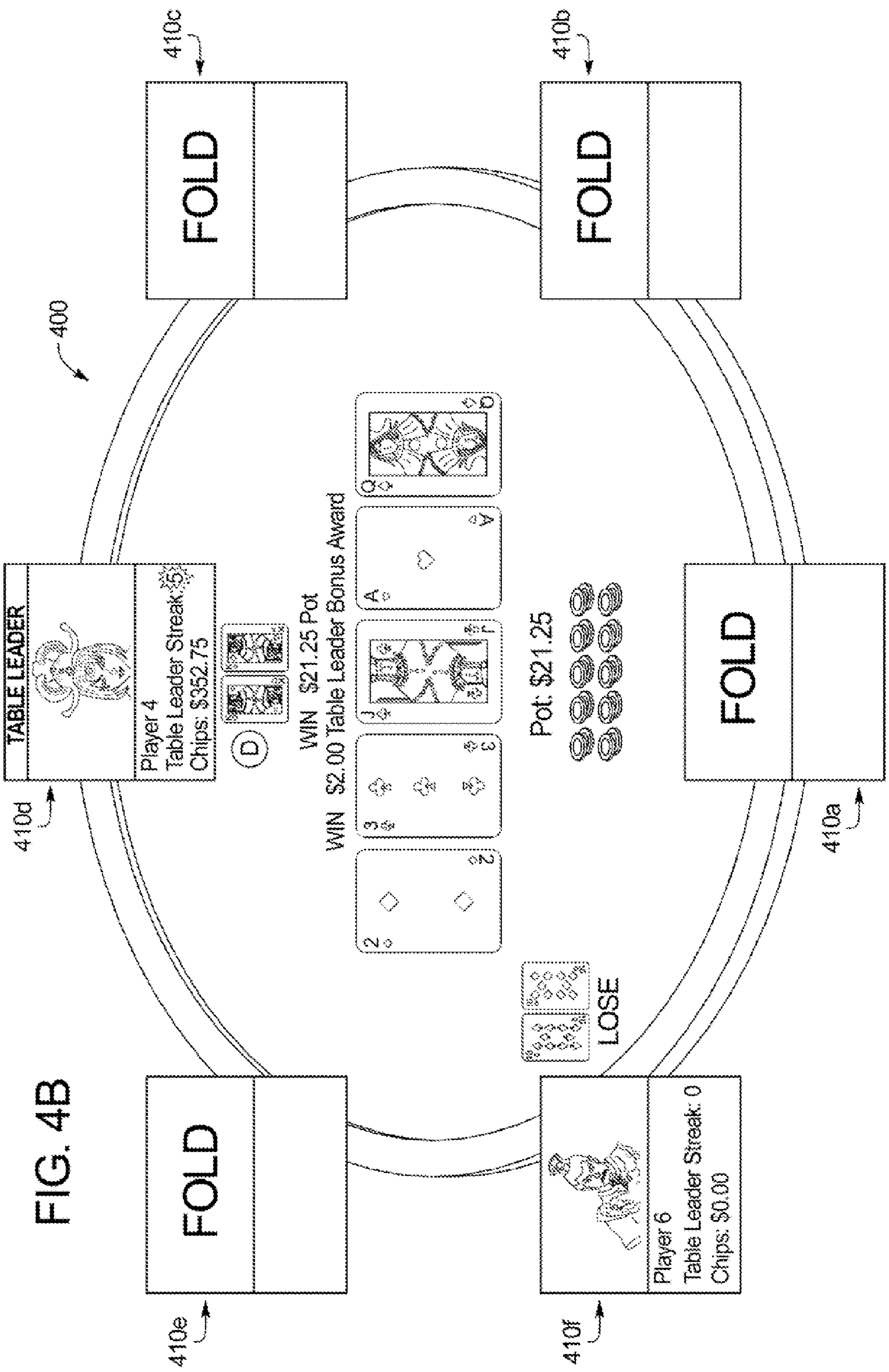

As illustrated in FIG. 4B, the gaming system received the first fold input from Players 1, 2, 3, and 5 during the play of the card game. Accordingly, the gaming system folded the hands of Players 1, 2, 3, and 5 and removed those players from their respective seats at the virtual table 400, leaving Players 4 and 6. The gaming system determines an outcome for the play of the card game, which includes a showdown win for Player 4 and a showdown loss for Player 6. The gaming system determines whether the determined outcome is a designated winning outcome for one of the players. In this example, the designated winning outcome is a showdown win; therefore, the gaming system determines that the determined outcome is the designated winning outcome for Player 4. Since Player 4 was the table leader for this play of the card game, the gaming system: (a) maintains Player 4 as the table leader (b) increments Player 4's table leader streak counter by one from four to five; (c) determines a table leader bonus award of $2.00 (which is equal to ((5)−1)*($0.50)*(1) (i.e., ((Streak Value of the Table Leader's Table Leader Streak Counter)−1)(Big Blind Amount)*(N)); and (d) provides the determined table leader bonus award of $2.00 to Player 4.

Figure 4C:
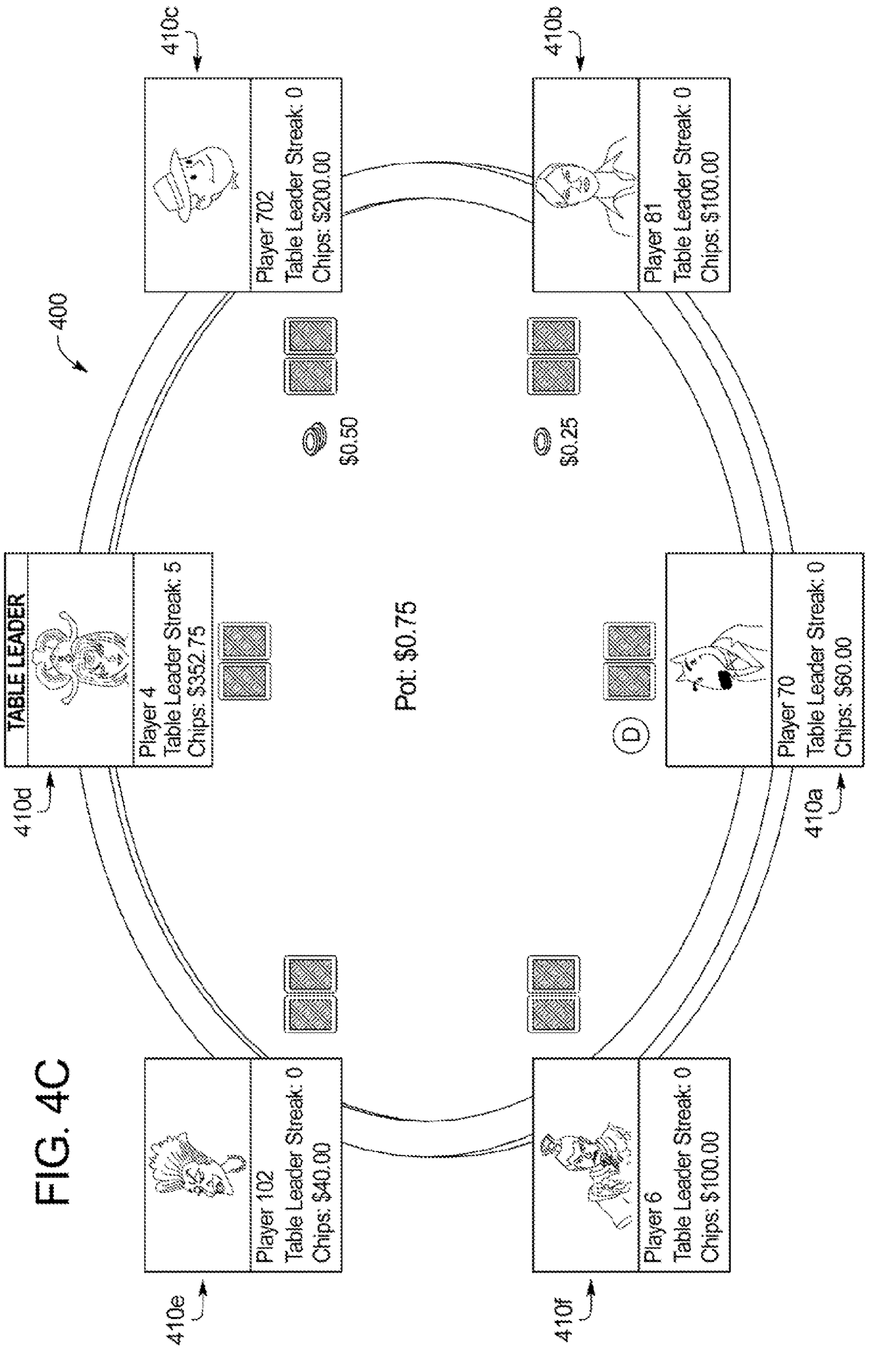

As illustrated in FIG. 4C, the gaming system assigns a new player to each of the empty seats as follows (such as by selecting players from the queue): Player 70 at seat 310*a*, Player 81 at seat 310*b*, Player 702 at seat 310*c*, and Player 102 at seat 310*e*. The gaming system associates each of these new players with a table leader streak counter having the initial streak value of zero. The gaming system provides another play of the card game.

Figure 4D:
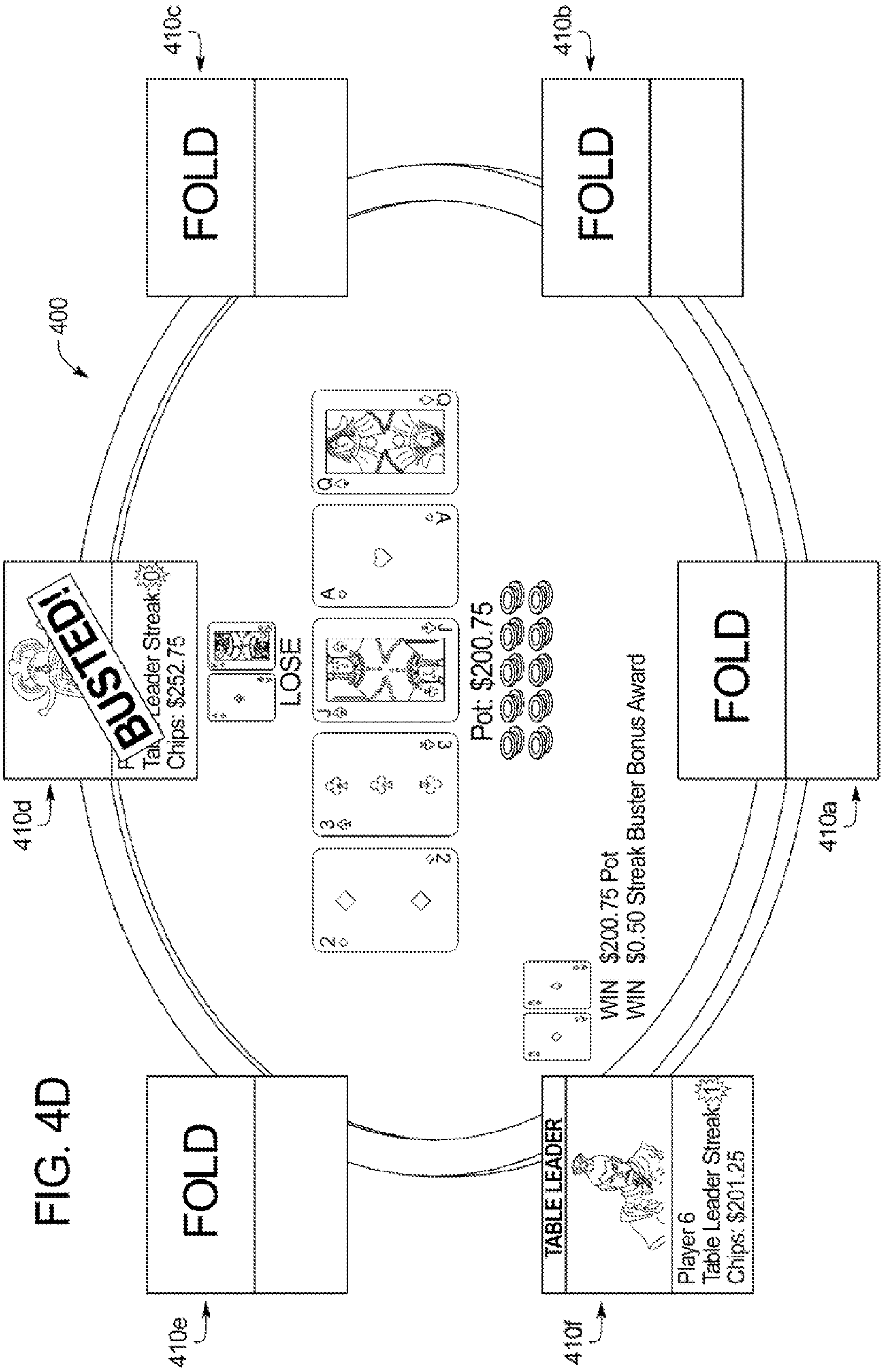

As illustrated in FIG. 4D, the gaming system received the first fold input from Players 70, 81, 702, and 102 during the play of the card game. Accordingly, the gaming system folded the hands of Players 70, 81, 702, and 102 and removed those players from their respective seats at virtual table 400, leaving Players 4 and 6. The gaming system determines an outcome for the play of the card game, which includes a showdown win for Player 6 and a showdown loss for Player 4. The gaming system determines whether the determined outcome is a designated winning outcome for one of the players. In this example, the designated winning outcome is a showdown win; therefore, the gaming system determines that the determined outcome is the designated winning outcome for Player 6. Player 4 was the table leader for this play of the card game. Accordingly, the gaming system: (a) replaces Player 4 with Player 6 as the table leader; (b) resets Player 4's table leader streak counter from five to zero (i.e., to the initial streak value); (c) increments Player 6's table leader streak counter by one from zero to one; (d) determines not to provide any table leader streak award (i.e., determines a table leader bonus award of $0.00 (which is equal to ((1)−1)*($0.50)*(1) (i.e., ((Streak Value of the Table Leader's Table Leader Streak Counter)−1)*(Big Blind Amount)*(N)); (e) determines a streak buster bonus award of $0.50 (which is equal to ($0.50.)*(1)*(1) (i.e., (Big Blind)*(M)*(N)); and (f) provides the determined streak buster bonus award of $0.50 to Player 6.

Nemesis Bonus Award

In certain embodiments, the card game is associated with a nemesis bonus award that the gaming system provides to a player who achieves a designated winning outcome, such as a showdown win, over another player at least a designated quantity of times before that other player achieves the designated winning outcome over the player. It should be appreciated that each player has (or potentially has) his or her own unique nemesis (or nemeses); that is, whether the gaming system provides the nemesis bonus award varies from player to player.

In one embodiment, for a first player at a virtual table of a plurality of players, the gaming system associates each other player with a first player nemesis counter, which tracks how close that other player is to becoming the first player's nemesis. When one of the other players achieves the designated winning outcome over the first player, the gaming system increments that other player's first player nemesis counter. On the other hand, when the first player achieves the designated winning outcome over one of the other players, the gaming system resets that other player's first player nemesis counter to an initial value. When the first player nemesis counter of one of the other players reaches a designated value, the gaming system labels that other player as a nemesis of the first player and provides that other player with the nemesis bonus award. In this embodiment, if the determined outcome is not a designated winning outcome for any of the players over any of the other players, the gaming system does not modify any of the players' nemesis counters.

In this embodiment, if a player leaves the virtual table (such as to stop playing the card game or to move to a different virtual table for at least one play of the card game) the gaming system resets any nemesis counters associated with that player and any nemesis counters of other players that are associated with that player.

It should be appreciated that the nemesis bonus award encourages a player to remain at the same virtual table and continue playing the card game to attempt to continue achieving the designated winning outcome over another player as many times as possible to become that player's nemesis and win the nemesis bonus award.

In various embodiments, the designated winning outcome is: (a) any winning outcome, (b) any winning outcome after the gaming system displays the flop, (c) any winning outcome after the gaming system displays the turn, (d) any winning outcome after the gaming system displays the river, (e) any winning outcome after wagering is closed, or (f) any showdown win.

In this embodiment, the nemesis bonus award is equal to: (Big Blind Amount)*(N). The variable N is described above. It should be appreciated that the nemesis bonus award may be determined in any other suitable manner.

Nemesis Bonus Award and Avenged Bonus Award

In certain embodiments in which the card game is associated with the nemesis bonus award, the card game is also associated with an avenged bonus award. In these embodiments, the gaming system provides the avenged bonus award to a player who achieves the designated winning outcome over a nemesis of that player, It should be appreciated that the avenged bonus award encourages players to remain at the same virtual table as their nemesis (or nemeses) and continue playing the card game to attempt to achieve the designated winning outcome over their nemesis (or nemeses) and win an avenged bonus award for doing so.

In this embodiment, the avenged bonus award is equal to: (Big Blind Amount)*(M)*(N). The variable N is described above. In this embodiment, the variable M is determined based on the number of times the avenged player had been defeated by the avenged player's nemesis, in other words, the variable M is determined based on the value of the nemesis's nemesis streak counter associated with the player. For instance, the value of the variable M (and, therefore the value of the avenged bonus award) increases as the value of the nemesis's streak counter associated with the player increases. In one example, the value of the variable M is equal to the value of the nemesis's nemesis streak counter associated with the player before it is reset such that the gaming system provides a larger avenged bonus award to a player who avenges a nemesis having a nemesis streak counter associated with the player that has value of five than the gaming system provides to a player who avenges a nemesis having a nemesis streak counter associated with the player that has a value of two.

In another example, the value of the variable M increases when the value of the nemesis's nemesis streak counter associated with the player meets a designated threshold. For instance, the variable M has a value of one if the value of the nemesis's nemesis streak counter associated with the player is below three when the player avenges that nemesis, a value of two if the value of the nemesis's nemesis streak counter associated with the player is three to five when the player avenges that nemesis, and a value of three if the value of the nemesis's nemesis streak counter associated with the player is greater than five when the player avenges that nemesis. It should be appreciated that the streak buster bonus award may be determined in any other suitable manner.

It should be appreciated that the avenged bonus award may be determined in any other suitable manner.

Figure 5:
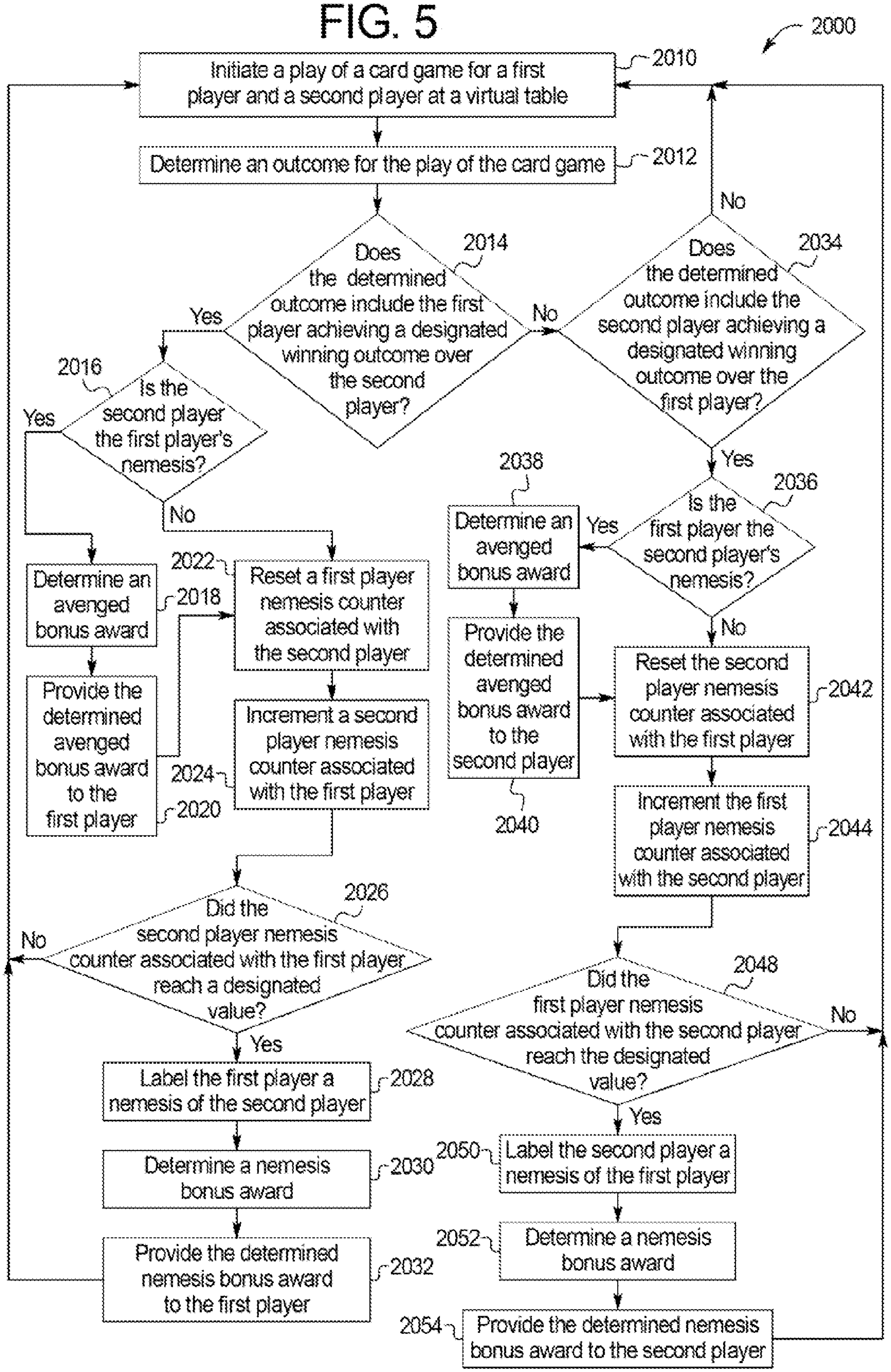
FIG. 5 is a flowchart illustrating a method of operating another example embodiment of the gaming system of the present disclosure configured to operate the multiplayer card game with multiple fold options and available nemesis and avenged bonuses.

FIG. 5 illustrates a flowchart of an example process or method 2000 of operating one such example embodiment of the gaming system of the present disclosure providing the card game to two players at a virtual table. In various embodiments, process 2000 is represented by a set of instructions stored in one or more memories and executed by one or more processors. Although process 2000 is described with reference to the flowchart shown in FIG. 5, it should be appreciated that many other processes of performing the acts associated with this illustrated process 2000 may be employed. For example, the order of certain of the illustrated blocks and/or diamonds may be changed, certain of the illustrated blocks and/or diamonds may be optional, and/or certain of the illustrated blocks and/or diamonds may not be employed.

In this example embodiment, the gaming system initiates a play of the card game for a first player and a second player at a virtual table, as indicated by block 2010. The gaming system determines an outcome for the play of the card game, as indicated by block 2012. The gaming system determines whether the determined outcome includes the first player achieving a designated winning outcome over the second player, as indicated by block 2014. If the gaming system determines that the determined outcome does not include the first player achieving the designated winning outcome over the second player, process 2000 proceeds to diamond 2034, described below.

If, on the other hand, the gaming system determines that the determined outcome includes the first player achieving the designated winning outcome over the second player, the gaming system determines whether the second player is the first player's nemesis, as indicated by diamond 2016. If the gaming system determines that the second player is not the first player's nemesis, process 2000 proceeds to block 2022, described below. If, on the other hand, the gaming system determines that the second player is the first player's nemesis, the gaming system: (a) determines an avenged bonus award, as indicated by block 2018; and (b) provides the determined avenged bonus award to the first player, as indicated by block 2020. The gaming system resets a first player nemesis counter associated with the second player, as indicated by block 2022, and increments a second player nemesis counter associated with the first player, as indicated by block 2024.

The gaming system determines if the second player nemesis counter associated with the first player reaches a designated value, as indicated by diamond 2026. If the gaming system determines that the second player nemesis counter associated with the first player does not reach the designated value, process 2000 returns to block 2010 for another play of the card game. If, on the other hand, the gaming system determines that the second player nemesis counter associated with the first player reaches the designated value, the gaming system: (a) labels the first player a nemesis of the second player, as indicated by block 2028; (b) determines a nemesis bonus award, as indicated by block 2030; and (c) provides the determined nemesis bonus award to the first player, as indicated by block 2032. Process 2000 returns to block 2010 for another play of the card game.

As noted above, if the gaming system determines that the determined outcome does not include the first player achieving the designated winning outcome over the second player, the gaming system determines whether the determined outcome includes the second player achieving the designated winning outcome over the first player, as indicated by diamond 2034. If the gaming system determines that the determined outcome does not include the second player achieving the designated winning outcome over the first player, process 2000 returns to block 2010 for another play of the card game.

If, on the other hand, the gaming system determines that the determined outcome includes the second player achieving the designated winning outcome over the first player, the gaming system determines whether the first player is the second player's nemesis, as indicated by diamond 2036. If the gaming system determines that the first player is not the second player's nemesis, process 2000 proceeds to block 2042, described below. If, on the other hand, the gaming system determines that the first player is the second player's nemesis, the gaming system: (a) determines an avenged bonus award, as indicated by block 2038; (b) provides the determined avenged bonus award to the second player, as indicated by block 2040; (c) resets a second player nemesis counter associated with the first player, as indicated by block 2042; and (d) increments a first player nemesis counter associated with the second player, as indicated by block 2044.

The gaming system determines if the first player nemesis counter associated with the second player reaches a designated value, as indicated by diamond 2048. If the gaming system determines that the first player nemesis counter associated with the second player does not reach the designated value, process 2000 returns to block 2010 for another play of the card game. If, on the other hand, the gaming system determines that the first player nemesis counter associated with the second player reaches the designated value, the gaming system: (a) labels the second player a nemesis of the first player, as indicated by block 2050; (b) determines a nemesis bonus award, as indicated by block 2052; and (c) provides the determined nemesis bonus award to the second player, as indicated by block 2054. Process 2000 returns to block 2010 for another play of the card game.

FIGS. 6A, 6B, 6C, and 6D illustrate screen shots of one example embodiment of the gaming system of the present disclosure providing plays of the card game for two players at a virtual table in which a nemesis bonus award and an avenged bonus award are available to be won. As noted above, in this example embodiment the card game is Texas Hold 'Em.

Figure 6A:
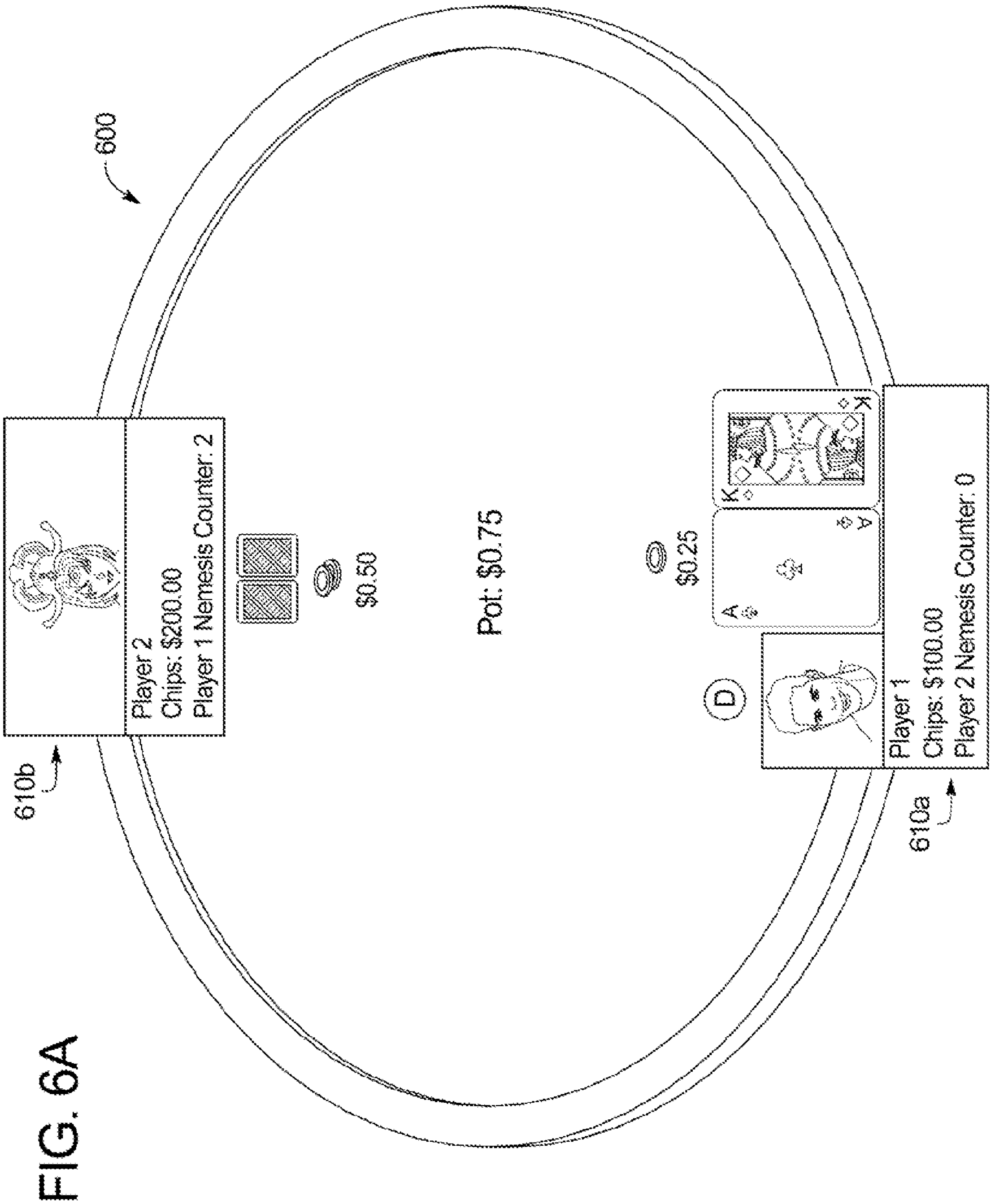
FIGS. 6A, 6B, 6C, and 6D illustrate screen shots of another example embodiment of the gaming system of the present disclosure providing plays of the multiplayer card game with multiple fold options and available nemesis and avenged bonuses according to the methods of FIGS. 1A and 5.

As illustrated in FIG. 6A, the gaming system initiates a play of the card game for Player 1 seated at seat 610*a* of virtual table 600 and Player 2 seated at seat 610*b* of virtual table 600. The gaming system displays a Player 2 Nemesis Counter associated with Player 1, which indicates how close Player 1 is to becoming Player 2's nemesis and winning the nemesis bonus award, and a Player 1 Nemesis Counter associated with Player 2, which indicates how close Player 2 is to becoming Player 1's nemesis and winning the nemesis bonus award.

It should be appreciated that the plays of the card game in this example embodiment are shown from the perspective of Player 1. The gaming system deals each of the players a hand of two virtual cards. Since this play of the card game is shown from the perspective of Player 1, the gaming system displays Player 1's virtual hand of A♣ K♦.

Figure 6B:
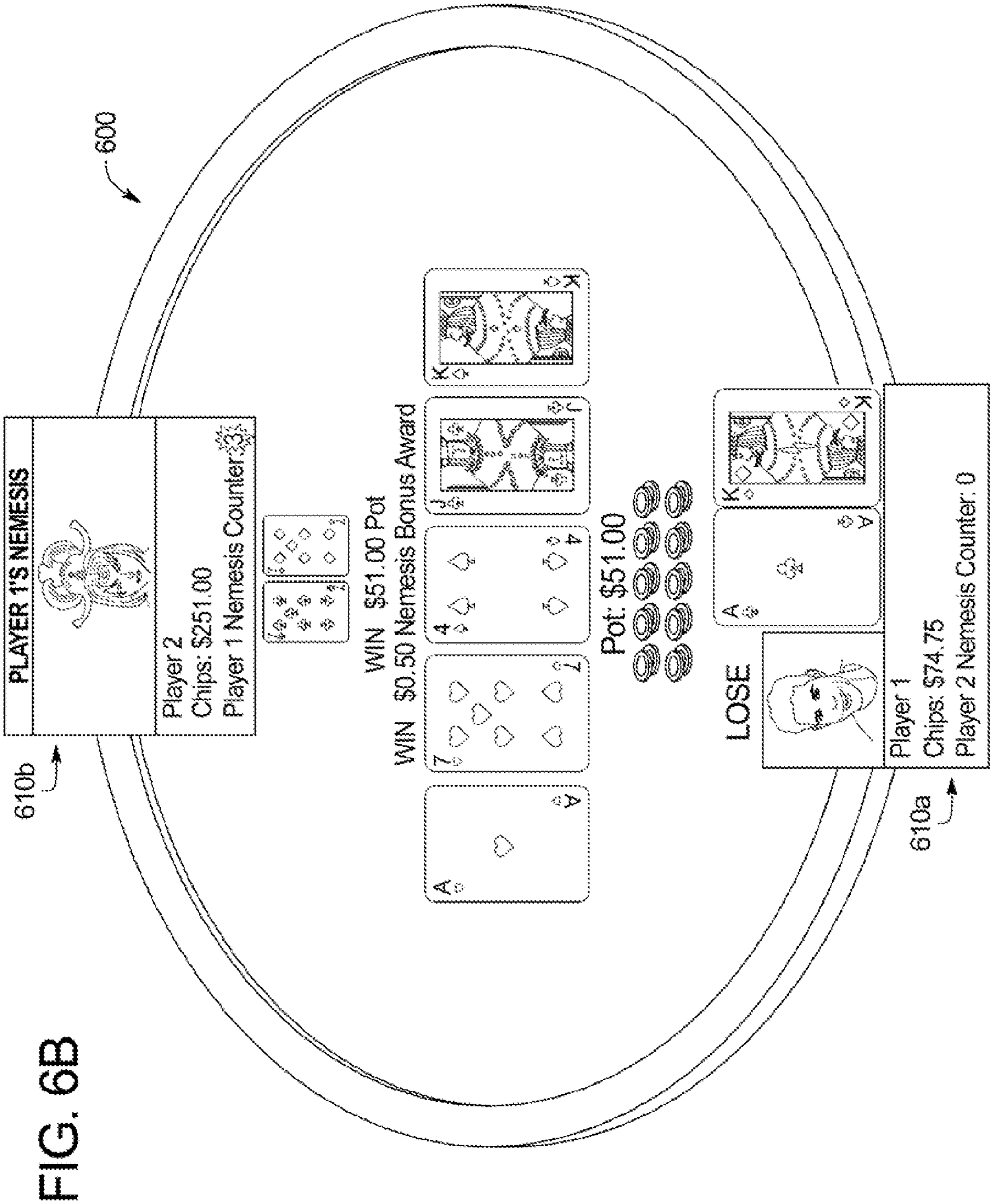

As illustrated in FIG. 6B, the gaming system determines an outcome for the play of the card game, which includes a showdown win for Player 2 and a showdown loss for Player 1. The gaming system determines whether the determined outcome includes Player 2 achieving a designated winning outcome over Player 1. In this example, the designated winning outcome is a showdown win; therefore, the gaming system determines that the determined outcome includes Player 2 achieving the designated winning outcome over Player 1. Since at this point Player 1 is not Player 2's nemesis, the gaming system determines not to provide any avenged bonus award to Player 2. The gaming system increments the Player 1 Nemesis Counter associated with Player 2 by one from two to three and determines whether the Player 1 Nemesis Counter reaches a designated value. In this example, the designated value is three; therefore, the gaming system determines that the Player 1 Nemesis Counter associated with Player 2 reaches the designated value of three.

Accordingly, the gaming system: (a) labels Player 2 as Player 1's nemesis; (b) determines a nemesis bonus award of $0.50 (which is equal to ($0.50.)*(1) (i.e., (Big Blind)*(N)); and (c) provides the determined nemesis bonus award to Player 2.

Figure 6C:
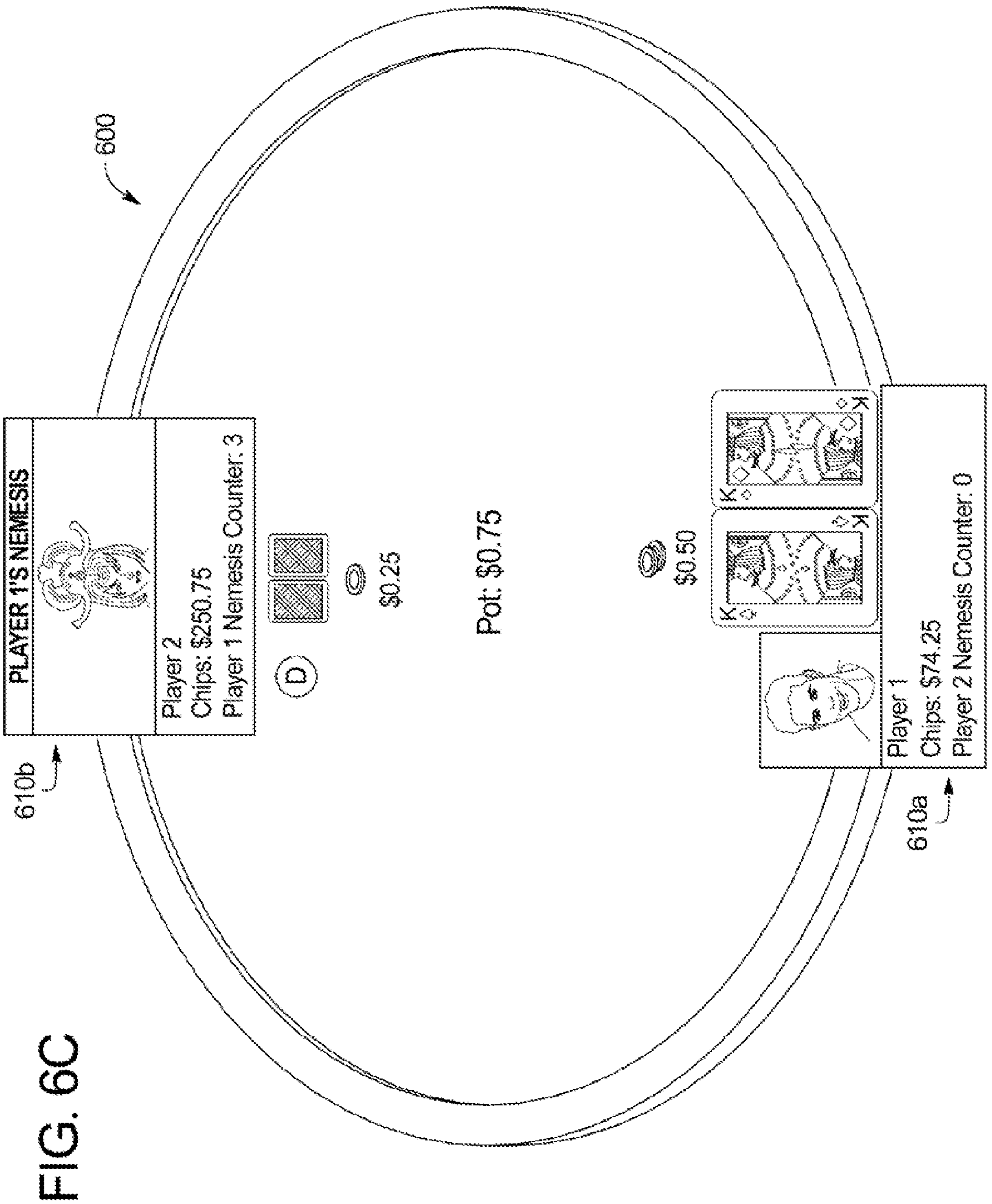

As illustrated in FIG. 6C, the gaming system provides another play of the card game. The gaming system deals each of the players a hand of two virtual cards. Since this play of the card game is shown from the perspective of Player 1, the gaming system displays Player 1's virtual hand of K♣ K♦.

Figure 6D:
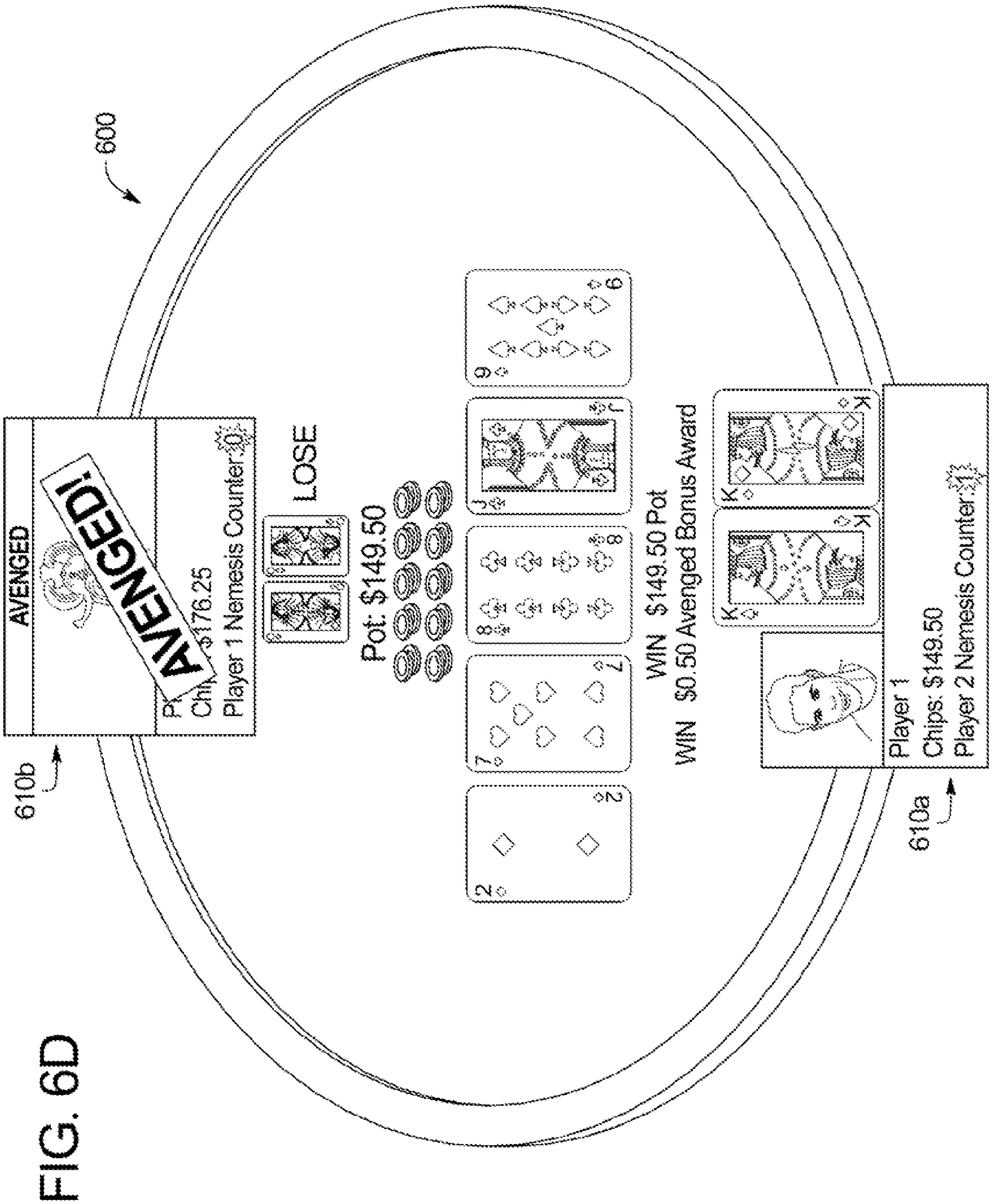

As illustrated in FIG. 6D, The gaming system determines an outcome for the play of the card game, which includes a showdown win for Player 1 and a showdown loss for Player 2. The gaming system determines whether the determined outcome includes Player 1 achieving a designated winning outcome over Player 2. In this example, the designated winning outcome is a showdown win; therefore, the gaming system determines that the determined outcome includes Player 1 achieving the designated winning outcome over Player 2. Since at this point Player 2 is Player 1's nemesis, the gaming system: (a) determines an avenged bonus award of $0.50 (which is equal to ($0.50.)*(1)*(1) (i.e., (Big Blind)*(M)*(N)); and (b) provides the determined avenged bonus award to Player 1.

The gaming system resets the Player 1 Nemesis Counter associated with Player 2 to zero, increments the Player 2 Nemesis Counter associated with Player 1 by one from zero to one, and determines whether the Player 1 Nemesis Counter reaches a designated value. In this example, the designated value is three; therefore, the gaming system determines that the Player 2 Nemesis Counter associated with Player 1 does not reach the designated value of three.

Knockout Bonus Award

In certain embodiments, the card game is associated with a knockout bonus award that the gaming system provides to a player who wins all of the chips of another player (i.e., wins when that other player is "all-in").

In this embodiment, the knockout bonus award is equal to: (Big Blind Amount)*(M)*(N). The variable N is described above. In this embodiment, the variable M is determined based on the number of players the knocked-out player has eliminated during that knocked-out player's gaming session. For instance, the value of the variable M increases as the number of players the knocked-out player knocked out during that knocked-out player's gaming session increases. It should be appreciated that the knockout bonus award may be determined in any other suitable manner.

Tournaments

It should be appreciated that the present disclosure contemplates providing the card game in a tournament setting. In one example embodiment, the gaming system provides a sit and go tournament for fifteen players. In this embodiment, the gaming system seats the fifteen players at three five player virtual tables. Here, when the gaming system receives the first fold input from one of the players, the gaming system moves that player to an empty seat (if any) at another one of the virtual tables, as generally described above. Once only five of the fifteen players remain in the tournament, the gaming system prevents the remaining players from providing the first fold input, since there are no other tables to which those players may move. In this example embodiment, the blind levels increase at a relatively fast pace, such as every three minutes to every four and a half minutes.

In another example embodiment, the gaming system provides a weekly tournament. In this example embodiment, the weekly tournament has substantially the same structure as the site and go tournament with two exceptions: (a) the blinds do not increase; and (b) each player keeps that player's chips for one week, and at the end of the week the gaming system provides the top X % (wherein X is set by the gaming establishment) with awards, such as virtual goods and/or virtual currency.

Variations

It should be appreciated that the card game may include any suitable combination of the above-described bonus awards that are available to be won by one or more players during the course of one or more plays of the card game. It should further be appreciated that:

(a) the initial streak value of the table leader streak counter;
(b) the initial value of the nemesis counter.
(c) the designated winning condition;
(d) the amount by which the table leader streak counter increments;
(e) the amount by which the nemesis counter increments;
(f) the value of the table leader bonus award;
(g) the value of the streak buster bonus award;
(h) the value of the nemesis bonus award;
(i) the value of the avenged bonus award;
(j) the value of the knockout bonus award;
(k) which bonus awards are available to be won;
(l) how the variable N is determined in any of the award value formulas described herein;
(m) the value of the variable N;
(n) the value of the variable M;
(o) how the variable M is determined in any of the award value formulas described herein;
(p) the maximum and minimum values of the variables N and M;
(q) any multipliers employed for any of the bonus awards;
(r) any of the designated quantities described herein; and/or
(s) any other variables or determinations described herein may be: (1) predetermined; (2) randomly determined; (3) randomly determined based on one or more weighted percentages: (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another: (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 7A:
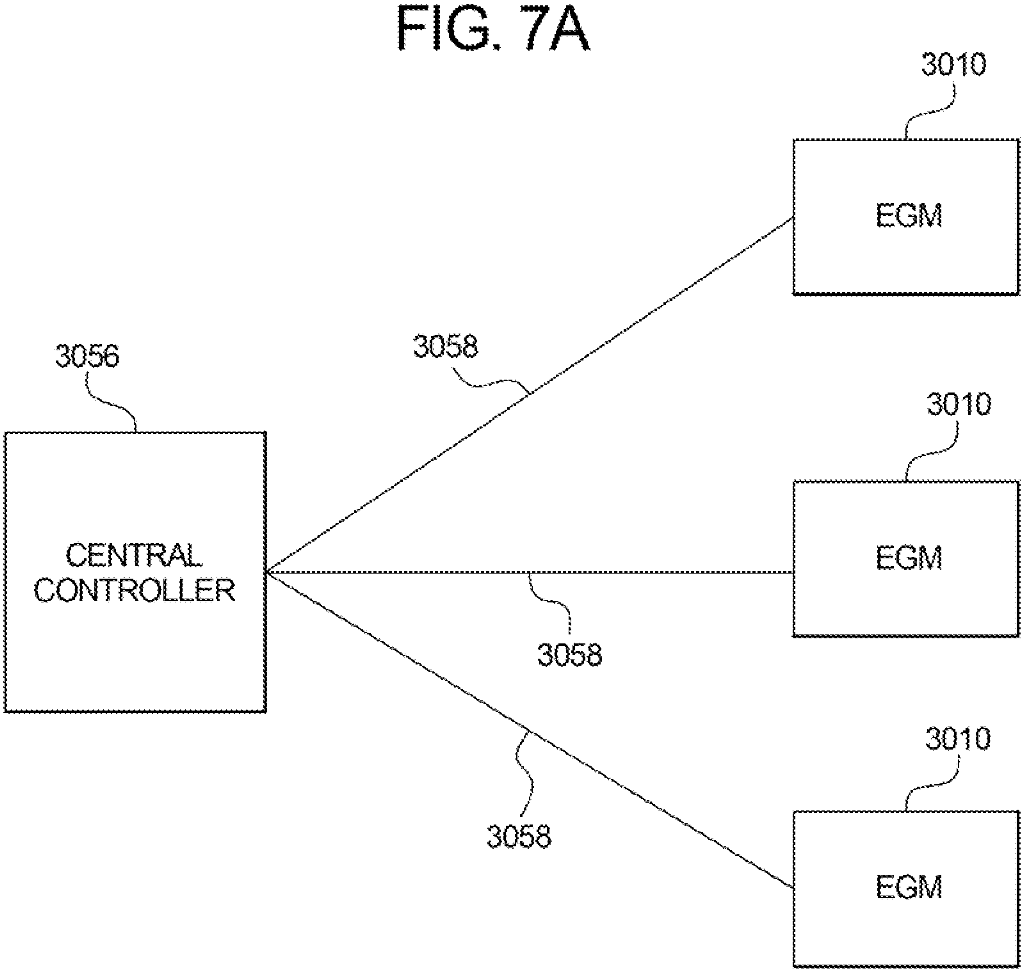
FIG. 7A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 7A includes a plurality of EGMs 3010 that are each configured to communicate with a central server, central controller, or remote host 3056 through a data network 3058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the intemrnet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 7B:
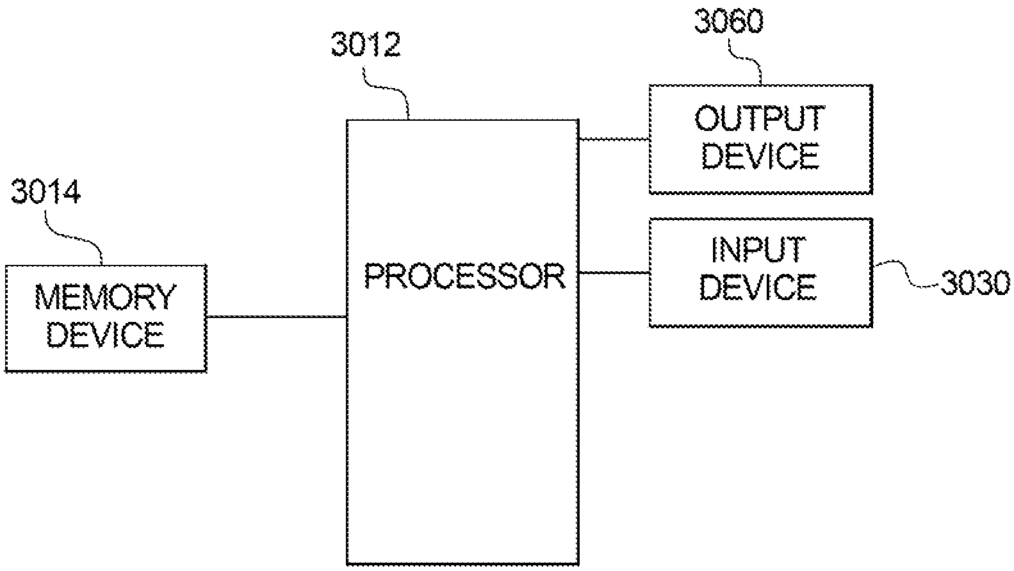
FIG. 7B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 7B illustrates an example EGM including a processor 3012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 7B includes a memory device 3014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 8A:
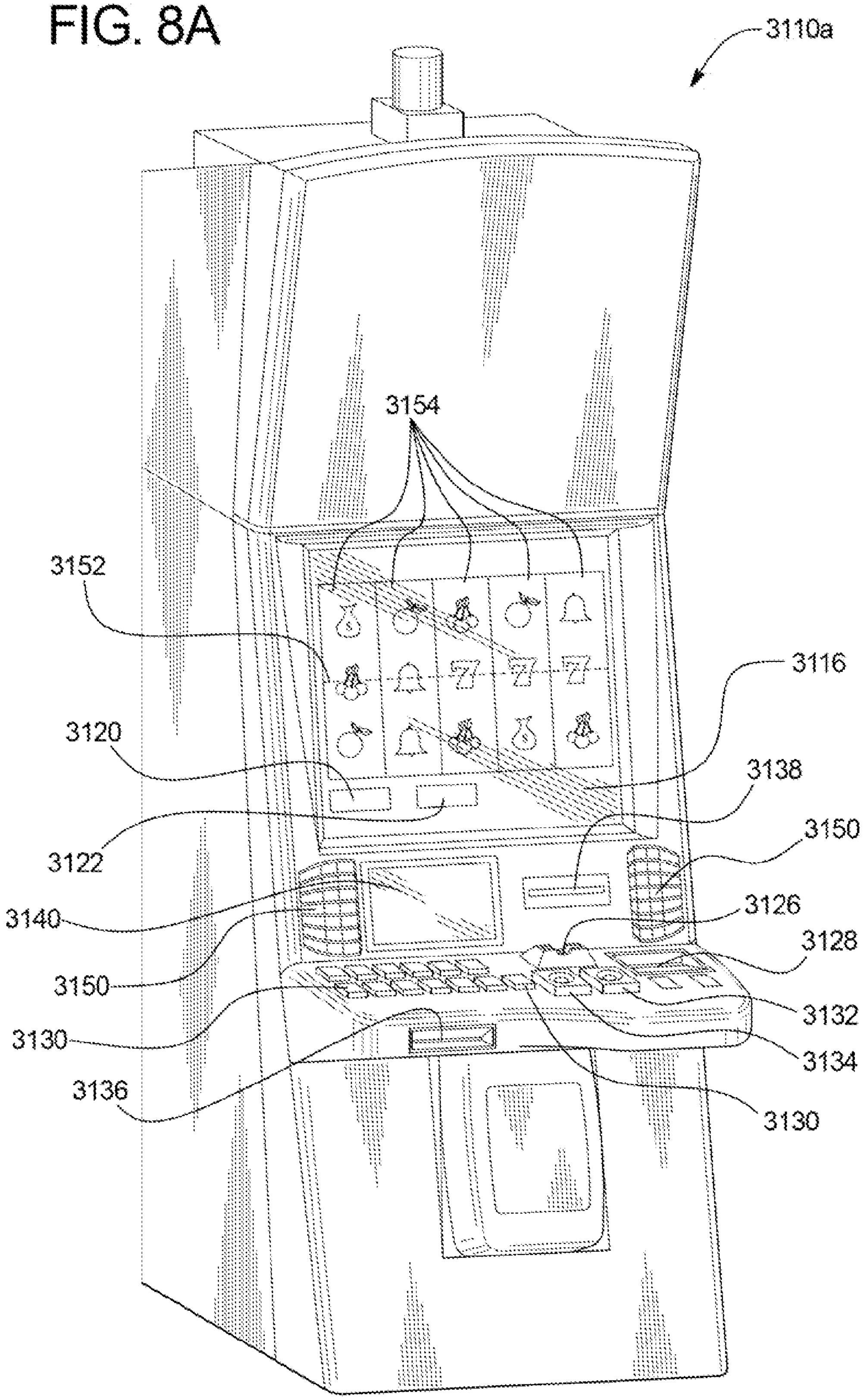
FIGS. 8A and 8B are perspective views of example alternative embodiments of the gaming system of the present disclosure.
Figure 8B:
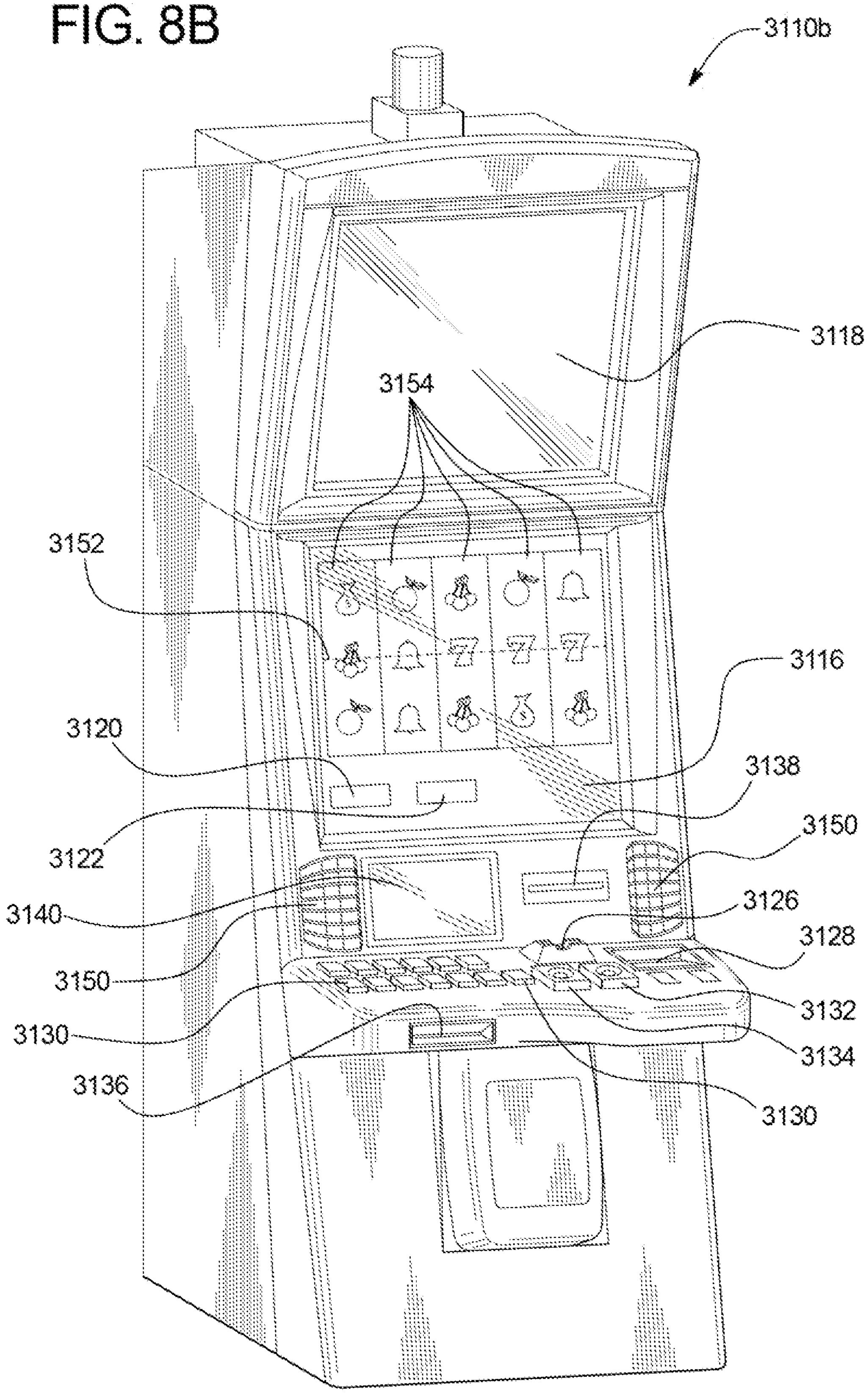

In various embodiments, the EGM includes one or more input devices. The input devices may include any suitable device that enables an input signal to be produced and received by the at least one processor of the EGM. The example EGM illustrated in FIG. 7B includes at least one input device 3030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 8A and 8B illustrate example EGMs that each include the following payment devices: (a) a combined bill and ticket acceptor 3128, and (b) a coin slot 3126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 8A and 8B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 8A and 8B each include a cash out device in the form of a cash out button 3134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 8A and 88 each include a card reader 3138. The card reader is configured to read a player identification card inserted into the card reader.

In various embodiments, the EGM includes one or more output devices. The example EGM illustrated in FIG. 7B includes at least one output device 3060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 8A includes a central display device 3116, a player tracking display 3140, a credit display 3120, and a bet display 3122. The example EGM illustrated in FIG. 8B includes a central display device 3116, an upper display device 3118, a player tracking display 3140, a player tracking display 3140, a credit display 3120, and a bet display 3122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting: video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 8A and 8B each include ticket generator 3136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 8A and 8B each include a plurality of speakers 3150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 8A and 8B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 8A and 8B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games: video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 8A and 8B include a payline 3152 and a plurality of reels 3154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311.605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a central controller configured to operate with a plurality of gaming machines playable by a plurality of players to, for each play of a card game at a virtual table:

(a) provide said play of the card game for a plurality of the players;

(b) determine an outcome of said play of the card game;

(c) if the determined outcome is a designated winning outcome for one of the players associated with a streak counter having a streak value greater than an initial streak value:

(i) increment the streak counter associated with said player, and (ii) if the streak value of said streak counter is at least a designated value:

(A) determine a streak award based at least in part on the streak value of said streak counter, and (B) provide the determined streak award to said player; and (d) if the determined outcome is the designated winning outcome for one of the players associated with a streak counter having the initial streak value:

(i) increment the streak counter associated with said player; and (ii) if a streak value of a streak counter associated with one of the other players at the virtual table is greater than the initial streak value:

(A) determine a bonus award;

(B) provide the determined bonus award to the player; and (C) reset the streak counter of said other player to the initial streak value.

2. The gaming system of claim 1, wherein each of the players at the virtual table is associated with a streak counter having a streak value.

3. The gaming system of claim 2, wherein the streak counter of only one of the players may be greater than the initial streak value.

4. The gaming system of claim 1, wherein the initial streak value is zero.

5. The gaming system of claim 1, wherein the central controller is configured to operate with the gaming machines to, if a first fold input is received at one of the gaming machines:

(a) remove the player of said gaming machine from the virtual table, (b) reset a streak counter associated with said player; and (c) assign said player to a second virtual table for at least one subsequent play of the card game.

6. The gaming system of claim 1, wherein the designated winning outcome is a showdown win.

7. A method of operating a gaming system, said method comprising:

causing a central controller to operate with a plurality of gaming machines playable by a plurality of players to, for each play of a card game at a virtual table:

(a) provide said play of the card game for a plurality of the players;

(b) determine an outcome of said play of the card game;

(c) if the determined outcome is a designated winning outcome for one of the players associated with a streak counter having a streak value greater than an initial streak value:

(i) increment the streak counter associated with said player; and (ii) if the streak value of said streak counter is at least a designated value:

(A) determine a streak award based at least in part on the streak value of said streak counter, and (B) provide the determined streak award to said player; and (d) if the determined outcome is the designated winning outcome for one of the players associated with a streak counter having the initial streak value:

(i) increment the streak counter associated with said player; and (ii) if a streak value of a streak counter associated with one of the other players at the virtual table is greater than the initial streak value:

(A) determine a bonus award;

(B) provide the determined bonus award to the player; and (C) reset the streak counter of said other player to the initial streak value.

8. The method of claim 7, which includes causing the central controller to operate with the plurality of gaming machines to associate each of the players at the virtual table with a streak counter having a streak value.

9. The method of claim 8, wherein the streak counter of only one of the players may be greater than the initial streak value.

10. The method of claim 7, wherein the initial streak value is zero.

11. The method of claim 7, which includes causing the central controller to operate with the gaming machines to, if a first fold input is received at one of the gaming machines:

(a) remove the player of said gaming machine from the virtual table, (b) reset a streak counter associated with said player; and (c) assign said player to a second virtual table for at least one subsequent play of the card game.

12. The method of claim 7, wherein the designated winning outcome is a showdown win.

13. The method of claim 7, which is provided through a data network.

14. The method of claim 13, wherein the data network is an internet.

15. A non-transitory computer readable medium storing a plurality of instructions which, when executed by at least one processor, cause the at least one processor to operate with a plurality of gaming machines playable by a plurality of players to, for each play of a card game at a virtual table:

(a) provide said play of the card game for a plurality of the players;

(b) determine an outcome of said play of the card game;

(c) if the determined outcome is a designated winning outcome for one of the players associated with a streak counter having a streak value greater than an initial streak value:

(i) increment the streak counter associated with said player; and (ii) if the streak value of said streak counter is at least a designated value:

(A) determine a streak award based at least in part on the streak value of said streak counter, and (B) provide the determined streak award to said player; and (d) if the determined outcome is the designated winning outcome for one of the players associated with a streak counter having the initial streak value:

(i) increment the streak counter associated with said player; and (ii) if a streak value of a streak counter associated with one of the other players at the virtual table is greater than the initial streak value:

(A) determine a bonus award;

(B) provide the determined bonus award to the player; and (C) reset the streak counter of said other player to the initial streak value.

16. The non-transitory computer readable medium of claim 15, wherein each of the players at the virtual table is associated with a streak counter having a streak value.

17. The non-transitory computer readable medium of claim 16, wherein the streak counter of only one of the players may be greater than the initial streak value.

18. The non-transitory computer readable medium of claim 15, wherein the initial streak value is zero.

19. The non-transitory computer readable medium of claim 15, wherein the plurality of instructions, when executed by the at least one processor, cause the at least one processor to operate with the gaming machines to, if a first fold input is received at one of the gaming machines:

(a) remove the player of said gaming machine from the virtual table, (b) reset a streak counter associated with said player; and (c) assign said player to a second virtual table for at least one subsequent play of the card game.

20. The non-transitory computer readable medium of claim 15, wherein the designated winning outcome is a showdown win.

* * * * *